United States Patent
Goto et al.

(10) Patent No.: US 8,436,718 B2
(45) Date of Patent: May 7, 2013

(54) NONCONTACT COMMUNICATION APPARATUS AND NONCONTACT COMMUNICATION METHOD

(75) Inventors: Tetsuro Goto, Kanagawa (JP); Shinichi Fukuda, Kanagawa (JP); Asahiko Nogami, Tokyo (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 12/801,318

(22) Filed: Jun. 3, 2010

(65) Prior Publication Data

US 2010/0328045 A1    Dec. 30, 2010

(30) Foreign Application Priority Data

Jun. 29, 2009  (JP) .................... 2009-153219

(51) Int. Cl.
*H04Q 5/22* (2006.01)
*H03H 7/00* (2006.01)

(52) U.S. Cl.
USPC ....... 340/10.4; 340/10.1; 340/10.51; 333/174

(58) Field of Classification Search ........ 340/10.1–10.4, 340/10.51; 333/174
See application file for complete search history.

(56) References Cited

U.S. PATENT DOCUMENTS

| | | | | |
|---|---|---|---|---|
| 5,680,459 A * | 10/1997 | Hook et al. ...................... 705/65 |
| 6,473,028 B1 * | 10/2002 | Luc ............................... 342/118 |
| 6,717,464 B2 * | 4/2004 | Fudaba et al. ................. 330/149 |
| 7,346,061 B2 * | 3/2008 | Takayama et al. .......... 370/395.4 |
| 7,447,286 B2 * | 11/2008 | Forrester ......................... 375/346 |
| 7,738,639 B2 * | 6/2010 | Sidhu et al. ................. 379/93.08 |
| 7,881,411 B2 * | 2/2011 | Sutton ............................ 375/345 |
| 2006/0259254 A1 * | 11/2006 | Swarztrauber et al. .......... 702/64 |
| 2008/0197982 A1 * | 8/2008 | Sadr ............................. 340/10.4 |
| 2009/0051445 A1 * | 2/2009 | Ellis ................................. 331/65 |
| 2009/0195366 A1 * | 8/2009 | Meier et al. ................. 340/10.51 |
| 2009/0273454 A1 * | 11/2009 | Onozuka et al. ........... 340/10.51 |
| 2009/0322445 A1 * | 12/2009 | Raidl et al. ..................... 333/174 |
| 2010/0136911 A1 * | 6/2010 | Sekita et al. ................. 455/41.2 |
| 2010/0156660 A1 * | 6/2010 | Lee et al. ................. 340/825.49 |
| 2010/0194536 A1 * | 8/2010 | Koo ............................. 340/10.1 |

FOREIGN PATENT DOCUMENTS

JP  10-187916  7/1998
JP  2005-011009  1/2005

* cited by examiner

*Primary Examiner* — Benjamin C Lee
*Assistant Examiner* — Adam Carlson
(74) *Attorney, Agent, or Firm* — Rader, Fishman & Grauer PLLC

(57) ABSTRACT

A noncontact communication apparatus is disclosed which includes: an antenna resonance circuit configured to have a coil for communicating with an opposite party through electromagnetic coupling; a changing block configured to change a Q-factor of the antenna resonance circuit; and a control block configured to control the antenna resonance circuit to transmit and receive data to and from the opposite party at one of a plurality of communication speeds prepared beforehand, the control block further controlling the changing block to reduce the Q-factor the higher the communication speed in use.

16 Claims, 29 Drawing Sheets

| COMMUNICATION SPEED | 212kbps | 424kbps | 848kbps | 1.7Mbps | 3.4Mbps |
|---|---|---|---|---|---|
| Q-FACTOR | Q=32 | Q=32 | Q=24 | Q=16 | Q=18 |

FIG.15

|  |  | COMMUNICATION SPEED | | | | |
|---|---|---|---|---|---|---|
|  |  | 212kbps | 424kbps | 848kbps | 1.7Mbps | 3.4Mbps |
| INTER-ANTENNA DISTANCE | 0.5mm | Q=32 | Q=32 | Q=24 | Q=16 | Q=8 |
| | 6mm | Q=32 | Q=32 | Q=32 | Q=24 | Q=16 |
| | 30mm | Q=32 | Q=32 | Q=32 | Q=32 | Q=24 |
| | 50mm | Q=32 | Q=32 | Q=32 | Q=32 | Q=32 |
| | 100mm | Q=32 | Q=32 | Q=32 | Q=32 | Q=32 |

FIG. 22

| INTER-ANTENNA DISTANCE | COMMUNICATION SPEED | | | | |
|---|---|---|---|---|---|
| | 212kbps | 424kbps | 848kbps | 1.7Mbps | 3.4Mbps |
| 0.5mm | Q=32 | Q=32 | Q=24 | Q=16 | Q=8 |
| 6mm | Q=32 | Q=32 | Q=32 | Q=24 | Q=16 |
| 30mm | Q=32 | Q=32 | Q=32 | Q=32 | Q=24 |
| 50mm | Q=32 | Q=32 | Q=32 | Q=32 | Q=32 |
| 100mm | Q=32 | Q=32 | Q=32 | Q=32 | Q=32 |

THE Q-FACTOR IS CHANGED ONE STEP LOWER UPON DETECTION OF A PREDETERMINED NUMBER OF COMMUNICATION ERRORS

Q-FACTOR ESTABLISHED UPON START OF COMMUNICATION

DURING HIGH-SPEED COMMUNICATION IN TRANSIT, THE FACTOR OPTIMALLY FIT FOR THE OPPOSITE DEVICE IS SELECTED FROM A PLURALITY OF Q-FACTOR CHANGING TABLES

IN LOW-SPEED COMMUNICATION WHERE THE Q-FACTOR IS NOT REQUIRED TO BE CHANGED, THE OPPOSITE DEVICE IS IDENTIFIED

NONCONTACT COMMUNICATION APPARATUS AND NONCONTACT COMMUNICATION METHOD

BACKGROUND OF THE INVENTION

1. Field of the Invention

The present invention relates to a noncontact communication method for permitting noncontact near-field communication illustratively between an IC (integrated circuit) card and a reader/writer through electromagnetic coupling, and a noncontact communication apparatus for use with that method.

2. Description of the Related Art

An example of the devices based on noncontact communication technology utilizing electromagnetic coupling is FeliCa (registered trademark). The NFC (Near Field Communication) Standard is a representative standard for near-field communications.

FIG. 30 is a schematic view explanatory of a noncontact communication system using the technology of FeliCa (registered trademark). This noncontact communication system is composed of a reader/writer 10 and a transponder 20.

In a well-known example shown in FIG. 31, the transponder 20 is provided in the form of a noncontact IC card, and the reader/writer 10 is installed illustratively in the ticket gates of railway stations or in automatic vending machines. A user 30 brings the transponder 20, which is the noncontact IC card held in his or her hand, close to the reader/writer 10 for personal identification and billing.

The reader/writer 10 is made up of an antenna resonance circuit 11 and a transmission/reception processing block 12. The antenna resonance circuit 11 is formed by a coil 11L for parallel resonance, a capacitor 11C, and a resistor 11R.

The transmission/reception processing block 12 includes a detection circuit and a demodulation circuit for detecting and demodulating an incoming signal, a control block of the reader/writer 10, and a modulation circuit for modulating an outgoing signal. The transponder 20 contains an antenna resonance circuit 21, a load change modulation circuit 22, and a transmission/reception processing block 23.

The antenna resonance circuit 21 is constituted by a coil 21L for parallel resonance, a capacitor 21C, and a resistor 21R. The load change modulation circuit 22 is composed of a resistor 22R and a semiconductor switch 22SW. The transmission/reception processing block 23 includes a detection circuit and a demodulation circuit for detecting and demodulating the incoming signal, a control block, and a modulation circuit for modulating the outgoing signal.

The semiconductor switch 22SW is controlled by a signal coming from the transmission/reception processing block 23. Upon receipt of the signal, the semiconductor switch 22SW is turned off. At transmission time, the semiconductor switch 22SW is turned on and off by the signal modulated to be transmitted.

The noncontact IC card constituting the above-described transponder 20 is a non-powered card. As such, the card obtains its own DC drive power by rectifying an induced current provided by the reader/writer 10 through electromagnetic induction.

Where the near-field communication system above is in use, the electromagnetic coupling between the antenna resonance circuit 21 of the transponder 20 and the antenna resonance circuit 11 of the reader/writer 10 permits communication between the transponder 20 and the reader/writer 10. In this case, the two parties involved in near-field communication typically utilize a carrier frequency of 13.56 MHz. Communication between the reader/writer 10 and the transponder 20 takes place at a transmission/reception distance D of 0 cm (contact state) through 10-plus cm.

The antenna resonance circuits 11 and 21 for the reader/writer 10 and transponder 20 are both designed to have a steep resonance frequency characteristic near the carrier frequency. The steep resonance frequency characteristic is provided so that the non-powered transponder 20 may acquire sufficient DC drive power and that the reader/writer 10 and transponder 20 may both obtain sufficient modulation signal intensity.

Illustratively, FIG. 32 shows a typical resonance frequency characteristic of the Edy (registered trademark) card used extensively in connection with the FeliCa (registered trademark) communication system. The resonance frequency characteristic shown in FIG. 32 represents measurements taken when the transmission/reception distance D between the reader/writer 10 and the transponder 20 is about 1 cm. The vertical axis of the graph in FIG. 32 denotes normalized parameters obtained by measuring instruments. The Q (quality) factor indicative of the steepness of resonance in the characteristic curve of FIG. 32 is approximately 49. The larger the Q-factor, the steeper the frequency characteristic of resonance.

The noncontact IC card for use with the above-outlined near-field communication system is disclosed illustratively in Japanese Patent Laid-Open No. Hei 10-187916 (called the Patent Document 1 hereunder) and Japanese Patent Laid-Open No. 2005-11009 (called the Patent Document 2 hereunder).

SUMMARY OF THE INVENTION

Usually, the communication speed (i.e., data transfer speed) for use in noncontact communication between the reader/writer 10 and the transponder 20 (e.g., noncontact IC card) is 212 kbps or 424 kbps. At such relatively low communication speeds, the spectral bandwidth of modulated waves is narrow. This means that a certain level of reception is guaranteed over the entire bandwidth even where the Q-factor is raised in conjunction with a steep resonance frequency characteristic such as is the case in FIG. 32.

In recent years, there has been a growing need for communicating large quantities of data using the above-described near-field communication setup. This trend entails the need for data communication at higher speeds (i.e., data transfer speeds) than ever before.

However, attempts to adopt higher communication speeds have met with a problem: the inability to perform stable data communication where the Q-factor is raised in conjunction with steep resonance frequency characteristics. This problem is explained below by referring to FIG. 33.

FIG. 33 shows typical spectral bandwidths at different communication speeds in conjunction with a steep resonance frequency characteristic curve with the Q-factor set to 50. The range indicated by each of bidirectional arrowed lines denotes the spectral bandwidth in effect at the communication speed corresponding to the arrowed line in question. In FIG. 33, the horizontal axis stands for frequencies and the vertical axis for reception levels observed at the receiving side.

The level on the vertical axis relative to the bidirectional arrowed line at each communication speed corresponds to a certain reception level guaranteed over the entire spectral bandwidth in question.

From FIG. 33, it can be seen that the higher the communication speed, the lower the sensitivity required for the domain of reception so that a certain level of reception may be guaranteed over the entire bandwidth used at each of the communication speeds involved.

As a result, it is difficult to guarantee an appropriate reception level if the Q-factor is set to be large in conjunction with a steep resonance frequency characteristic given to the antenna resonance circuit in use, as is the case in FIGS. 32 and 33.

The present invention has been made in view of the above circumstances and provides a noncontact communication apparatus and a noncontact communication method whereby stable noncontact communication is guaranteed even at high communication speeds.

According to an embodiment of the present invention, there is provided a noncontact communication apparatus including: an antenna resonance circuit configured to have a coil for communicating with an opposite party through electromagnetic coupling; changing means for changing a Q-factor of the antenna resonance circuit; and control means for controlling the antenna resonance circuit to transmit and receive data to and from the opposite party at one of a plurality of communication speeds prepared beforehand, the control means further controlling the changing means to reduce the Q-factor the higher the communication speed in use.

When the Q-factor of the antenna resonance circuit is reduced, the gradient of attenuation before and after a peaked resonance frequency is made gentler in the frequency characteristic of the antenna resonance circuit. Thus if the Q-factor of the antenna resonance circuit is reduced, with a given communication speed kept unchanged, it is possible to raise the reception level at which a certain degree of reception is guaranteed over the entire spectral bandwidth of communication signals communicated at that communication speed.

FIG. 1 graphically shows the frequency characteristic of an antenna resonance circuit with its Q-factor set to 40 (as a broken line curve 1) and the frequency characteristic of another antenna resonance circuit with its Q-factor set to 20 (as a solid line curve 2), the peak levels of the two curves coinciding with one another at a resonance frequency of 13.56 MHz.

As can be seen from FIG. 1, over the entire bandwidth of ±1.7 MHz with the Q-factor at 20, it is possible to obtain a reception level equivalent to the level in effect when the bandwidth of ±848 kHz is used with the Q-factor at 40. That is, reducing the Q-factor by half allows communication to take place under the same conditions as those in effect at half the communication speed.

According to the embodiment of the present invention, the control means controls the changing means to reduce the Q-factor of the antenna resonance circuit the higher the communication speed in use. This makes it possible to have stable noncontact communication at high communication speeds.

Preferably, the noncontact communication apparatus according to the embodiment of the present invention may further include: a detection block configured to receive via the antenna resonance circuit an incoming signal formed by a carrier signal multiplexed with information, the detection block further analyzing envelope changes in the incoming signal so as to generate a detection signal including the information; and an equalization processing block configured to correct the detection signal so as to output a corrected detection signal. The equalization processing block may be constituted by adaptive equalization means made up of a digital filter.

According to the above-outlined preferred structure of the embodiment of the present invention, the equalization processing block subjects the incoming signal to an adaptive equalization process for correcting waveform distortion. This makes it possible to demodulate the incoming signal more stably and without error.

In the preceding setup of the embodiment of the present invention, the higher the communication speed, the smaller the Q-factor of the antenna resonance circuit as explained. The attenuation gradient is made gentler before and after the peaked resonance frequency in the frequency characteristic of the antenna resonance circuit. This in turn makes it easier for the equalization processing block to correct waveform distortion. The equalization processing permits more stable, error-free demodulation of the signal even at higher communication speeds.

According to another embodiment of the present invention, there is provided a noncontact communication method for use with a noncontact communication apparatus including an antenna resonance circuit configured to have a coil for communicating with an opposite party through electromagnetic coupling, and changing means for changing a Q-factor of the antenna resonance circuit. The noncontact communication method includes the steps of: controlling the antenna resonance circuit to transmit and receive data to and from the opposite party at one of a plurality of communication speeds prepared beforehand; and controlling the changing means to reduce the Q-factor the higher the communication speed in use.

According to the present invention outlined above, the changing means is controlled to reduce the Q-factor of the antenna resonance circuit the higher the communication speed in use. This makes it possible to implement stable noncontact communication at higher communication speeds.

BRIEF DESCRIPTION OF THE DRAWINGS

FIG. 15 is a tabular view explanatory of a key point of the noncontact communication method as part of the third embodiment of the present invention;

FIG. 22 is a tabular view explanatory of a key point of the noncontact communication method as part of the fifth embodiment of the present invention;

DETAILED DESCRIPTION OF THE PREFERRED EMBODIMENTS

Some preferred embodiments of the present invention will now be described by referring to the accompanying drawings, with a FeliCa (registered trademark) communication system used as an example to which the embodiments are applied.
[First Embodiment]

Figure 2:
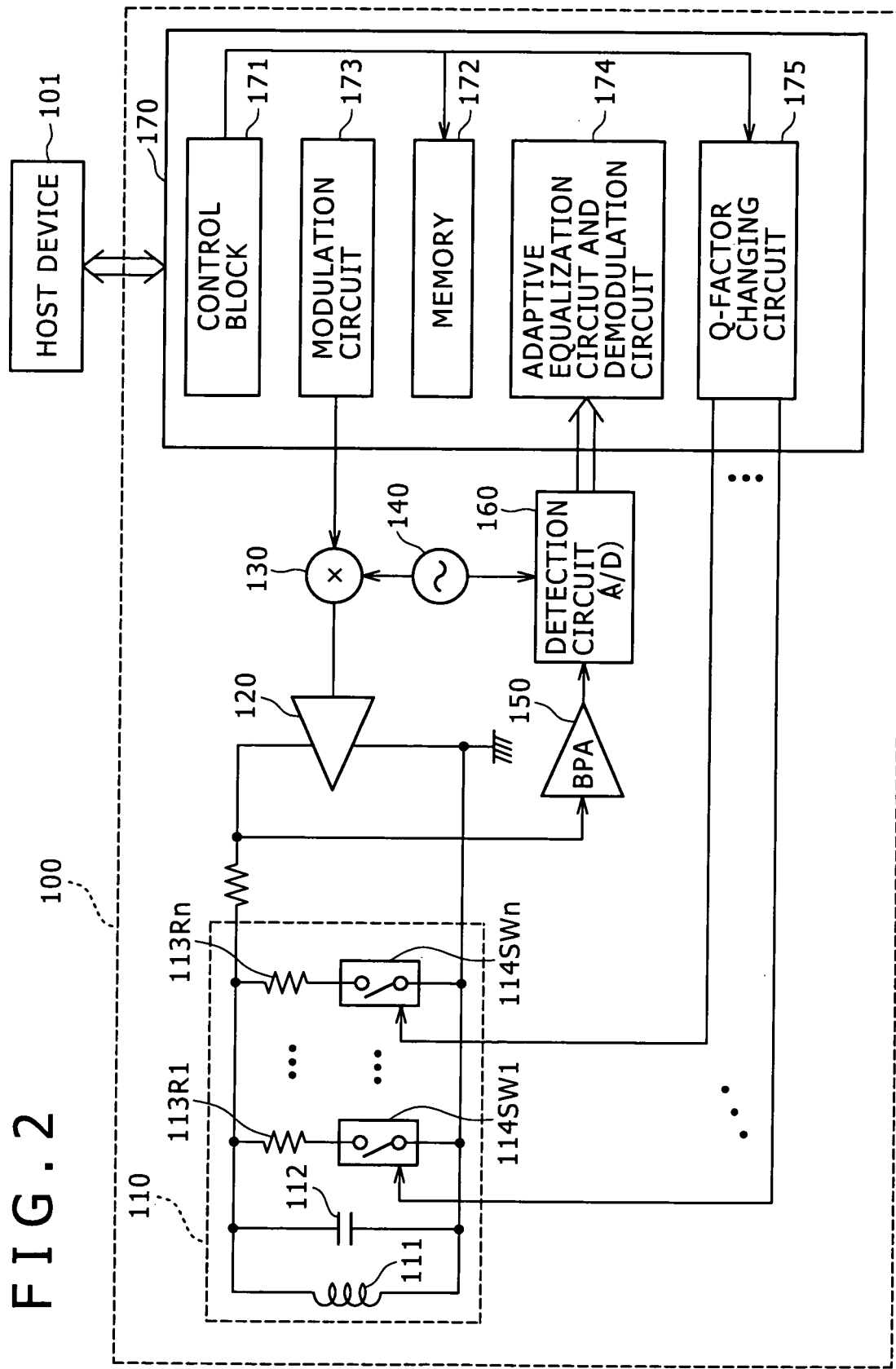
FIG. 2 is a block diagram showing a typical structure of a reader/writer acting as a noncontact communication apparatus as part of a first embodiment of the present invention.
Figure 3:
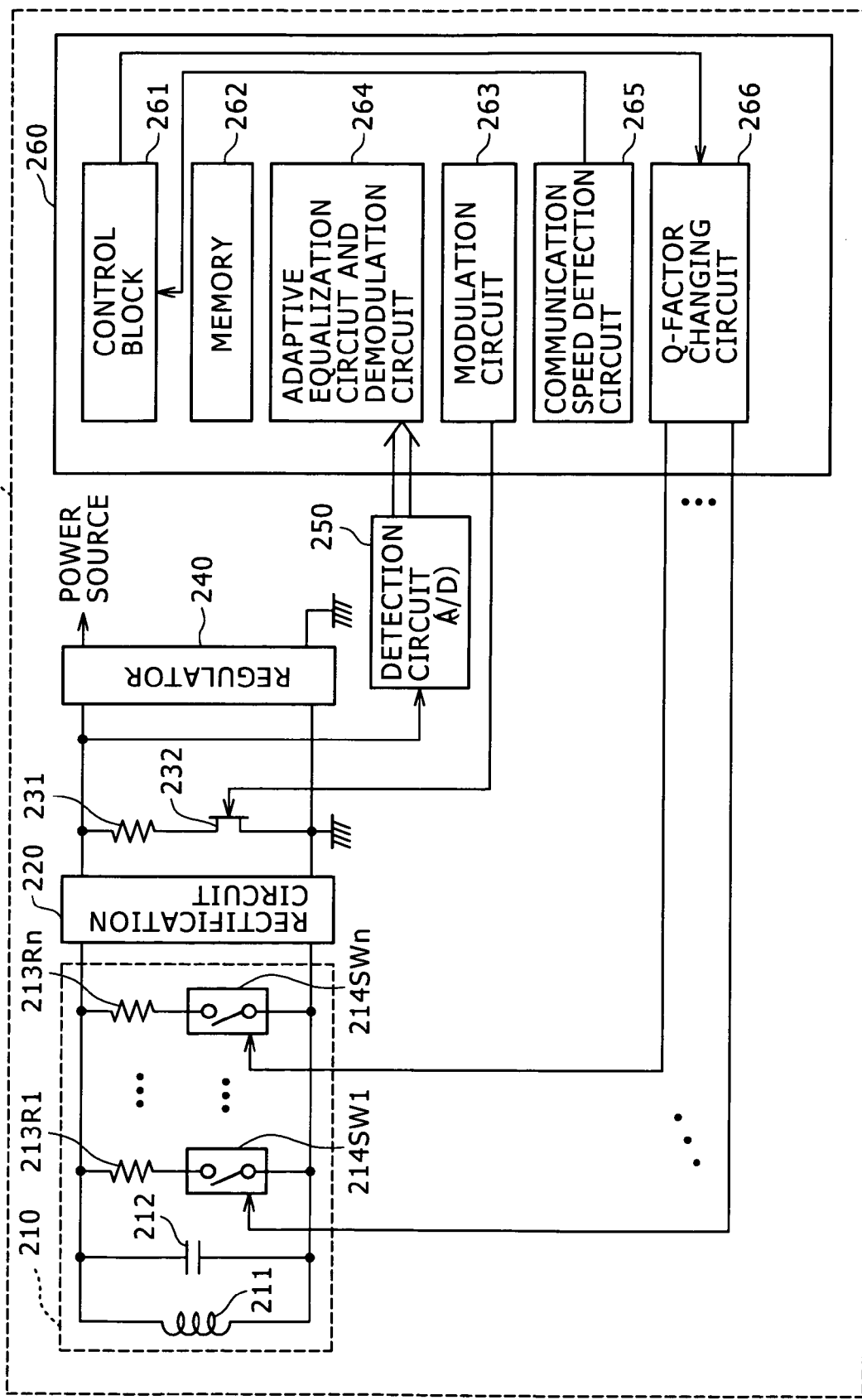
FIG. 3 is a block diagram showing a typical structure of a transponder acting as a noncontact communication apparatus as part of the first embodiment of the present invention.

FIG. 2 is a block diagram showing a typical structure of a reader/writer 100. FIG. 3 is a block diagram indicating a typical structure of a transponder 200 composed of a noncontact IC card.
<Structure of the Reader/writer 100>

The reader/writer 100 is made up of an antenna resonance circuit 110, a transmission amplifier 120, a mixer 130, a local oscillator 140, a band-pass amplifier 150, a detection circuit 160, and a signal processing section 170.

The reader/writer 100 is connected to a host device 101 via a USB (Universal Serial Bus) or an I$^2$C bus. The host device 101 is constituted by a control device (e.g., CPU (central processing unit)) of an apparatus in which this reader/writer 100 is installed.

The antenna resonance circuit 110 of the reader/writer 100 is formed by an antenna coil 111, a resonance capacitor 112, as many as "n" resistors 113R1 through 113Rn, and as many as "n" switch circuits 114SW1 through 114SWn. The suffix of each of the "n" resistors 113R1 through 113Rn is serially connected to the suffix of the corresponding one of the "n" switch circuits 114SW1 through 114SWn. Each of these series circuits is connected in parallel with the capacitor 112.

Each of the "n" switch circuits 114SW1 through 114SWn is turned on and off independently by switching signals coming from a Q-factor changing circuit 175 of the signal processing section 170. The Q-factor of the antenna resonance circuit 110 is varied depending on the on/off state of each of the "n" switch circuits 114SW1 through 114SWn.

That is, when one or a plurality of the "n" switch circuits 114SW1 through 114SWn connected to the "n" resistors 113R1 through 113Rn are turned on, the Q-factor of the antenna resonance circuit 110 is varied depending on the corresponding one or plurality of resistors that are connected parallelly with the capacitor 112.

The signal processing section 170 includes a control block 171, a memory 172, a modulation circuit 173, an adaptive equalization circuit and demodulation circuit 174, and the Q-factor changing circuit 175. The control block 171 is designed to control the reader/writer 100 in operation. The control block 171 may be implemented either as a hardware logic circuit or as a built-in CPU (central processing unit).

In this example, communication is assumed to be effected between the reader/writer 100 and the transponder 200 illustratively at five communication speeds of 212 kbps, 424 kbps, 848 kbps, 1.7 Mbps, and 3.4 Mbps. The control block 171 communicates with the transponder 200 at the communication speed selected from the five communication speeds.

The control block 171 determines by itself the communication speed at which to communicate. Alternatively, the control block 171 may determine the speed for communication based on a control command issued illustratively by the host device 101.

Suppose that transmission information is sent from the host device 101. In such a case, if the communication speed included in the transmission information is construed as favoring high-speed communication, then the control block 171 selects the highest of the communication speeds available for communication with the transponder 200 acting as the opposite party.

As described above, the control block 171 continuously keeps track of the currently utilized communication speed. The control block 171 supplies information about the communication speed to the Q-factor changing circuit 175, as will be discussed later.

The memory 172 is a nonvolatile memory. In addition to the information for authentication between the reader/writer 100 and the transponder 200, the memory 172 stores Q-factor changing table information which defines correspondence between communication speeds and Q-factors for the antenna resonance circuit 110.

Figures 4, 5:
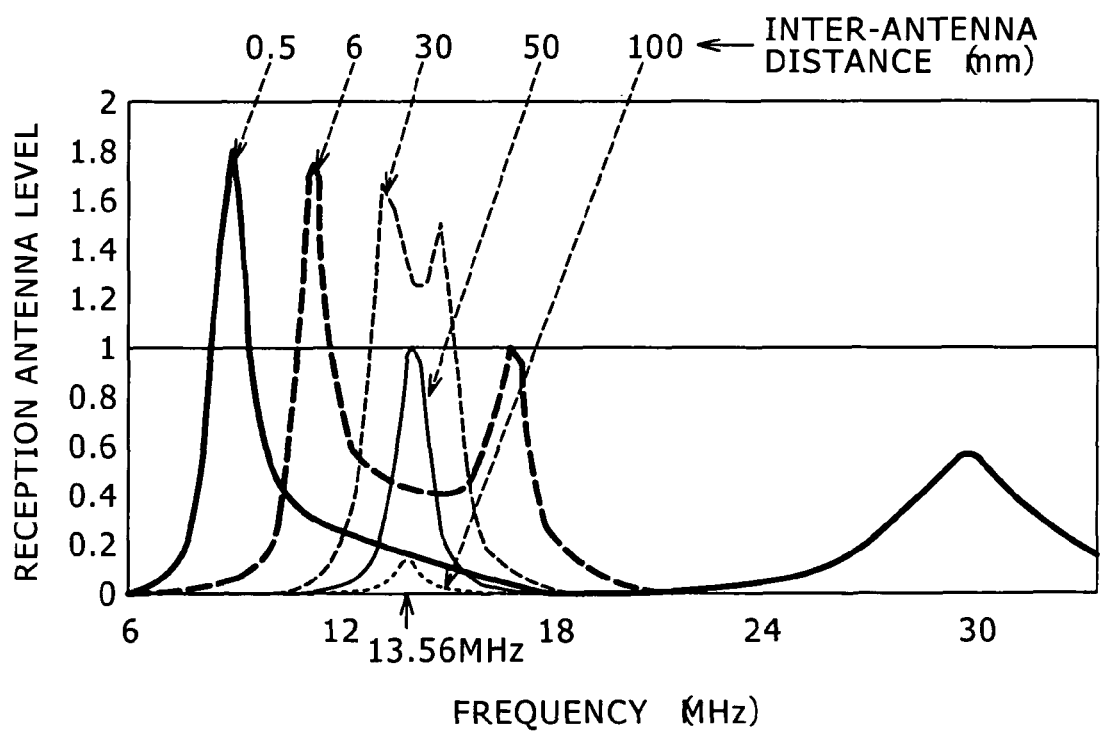
FIG. 4 is a tabular view explanatory of another key point of the noncontact communication method embodying the present invention.
FIG. 5 is a graphic representation explanatory of the noncontact communication method embodying the present invention.

FIG. 4 shows typical Q-factor changing table information of this example. In this example, as mentioned above, communication is made possible between the reader/writer 100 and the transponder 200 at any one of the five communication speeds (i.e., data transfer speeds).

With this embodiment, an optimal Q-factor for the antenna resonance circuit 110 is set beforehand for communication at each of the five communication speeds. As shown in FIG. 4, the memory 172 stores the Q-factor changing table information defining the relations of correspondence between the communication speeds and the Q-factor settings.

More specifically, as indicated in FIG. 4, the lower the communication speed in use, the larger the Q-factor being set; the higher the communication speed, the smaller the Q-factor established. In the example of FIG. 4, the Q-factor is the largest at 32 for the lowest communication speeds of 212 kbps and 424 kbps. The Q-factor is set to 24 for the intermediate communication speed of 848 kbps. The Q-factor is set to 16 for the higher communication speed of 1.7 MHz. The Q-factor is the smallest at 8 for the highest communication speed of 3.4 MHz.

As described above, the higher the communication speed in use, the smaller the Q-factor set for the antenna resonance circuit 110. This makes it possible to raise the reception level at which a certain level of reception is guaranteed over the entire spectral bandwidth of modulated waves at high communication speeds. This in turn translates into stable communication being carried out.

The modulation circuit 173 generates and outputs an outgoing signal (modulation signal) in which is modulated the information to be transmitted to the transponder (e.g., non-contact IC card) 200. The outgoing signal output from the modulation circuit 173 is fed to the mixer 130. Multiplied by a local oscillation frequency signal output from the local oscillator 140, the outgoing signal is frequency-converted to the carrier frequency of 13.56 MHz.

The outgoing signal frequency-converted by the mixer 130 is sent to the antenna resonance circuit 110 through the transmission amplifier 120. From the antenna resonance circuit 110, the outgoing signal is transmitted wirelessly.

The adaptive equalization circuit and demodulation circuit 174 is a circuit block that demodulates an incoming signal while correcting any distortion that may have occurred in that signal over a wireless communication channel. An adaptive equalization circuit that constitutes part of the adaptive equalization circuit and demodulation circuit 174 will be discussed later in more detail.

In the reader/writer 100, the incoming signal received via the antenna resonance circuit 110 is forwarded to the detection circuit 160 by way of the band-pass amplifier 150. Supplied with the local oscillation frequency signal from the local oscillator 140, the detection circuit 160 converts the incoming signal having the carrier frequency of 13.56 MHz back to the frequency of the original modulation signal. That is, the detection circuit 160 acquires a detection output of the signal transmitted from the transponder 200.

The detection circuit 160 converts the detection output from analog to digital format. The resulting digital signal is fed to the adaptive equalization circuit and demodulation circuit 174 whereby the incoming signal is demodulated.

Upon receipt of the communication speed information from the control block 171, the Q-factor changing circuit 175 determines whether the communication speed has changed. On finding that a new communication speed is in effect, the Q-factor changing circuit 175 references the Q-factor changing table information in the memory 172 to recognize the Q-factor of the antenna resonance circuit 110 in effect at that communication speed.

The Q-factor changing circuit 175 determines whether the recognized Q-factor is different from the current Q-factor of the antenna resonance circuit 110. If the recognized Q-factor is found to be different, the Q-factor changing circuit 175 turns on/off the switch circuits 114SW1 through 114SWn in such a manner as to switch to the recognized Q-factor.

The function of the above-described Q-factor changing circuit 175 may be arranged to be part of the functionality of the control block 171. The supply voltage for the components of the reader/writer 100 is tapped from a battery arrangement or an external power source, not shown.

<Structure of the Transponder 200>

The transponder 200 is made up of an antenna resonance circuit 210, a rectification circuit 220, a load modulation circuit 230, a regulator 240, a detection circuit 250, and a signal processing section 260.

The antenna resonance circuit 210 in the transponder 200 is formed by an antenna coil 211, a resonance capacitor 212, as many as "n" resistors 213R1 through 213Rn, and as many as "n" switch circuits 214SW1 through 214SWn. The suffix of each of the "n" resistors 213R1 through 213Rn is serially connected to the suffix of the corresponding one of the "n" switch circuits 214SW1 through 214SWn. Each of these series circuits is connected in parallel with the capacitor 212.

Each of the "n" switch circuits 214SW1 through 214SWn is turned on and off independently by switching signals coming from a Q-factor changing circuit 266 of the signal processing section 260. The Q-factor of the antenna resonance circuit 210 is varied depending on the on/off state of each of the "n" switch circuits 214SW1 through 214SWn.

That is, when one or a plurality of the "n" switch circuits 214SW1 through 214SWn connected to the "n" resistors 213R1 through 213Rn are turned on, the Q-factor of the antenna resonance circuit 110 is varied depending on the corresponding one or plurality of resistors that are connected parallelly with the capacitor 212.

The rectification circuit 220 rectifies the incoming signal received by the antenna resonance circuit 210 and feeds the rectification output to the regulator 240. Given the rectification output from the rectification circuit 220, the regulator 240 generates a stabilized DC voltage and supplies it to the relevant components.

The signal processing section 260 is formed by a control block 261, a memory 262, a modulation circuit 263, an adaptive equalization circuit and demodulation circuit 264, a communication speed detection circuit 265, and a Q-factor changing circuit 266. The control block 261 is designed to control the transponder 200 in operation. The control block 261 may be implemented either as a hardware logic circuit or as a built-in CPU.

The memory 262 is a nonvolatile memory. In addition to the information for authentication between the transponder 200 and the reader/writer 100, the memory 262 stores Q-factor changing table information which defines correspondence between communication speeds and Q-factors for the antenna resonance circuit 210. In this example, the Q-factor changing table information stored in the memory 262 on the side of the transponder 200 is the same as that shown in FIG. 4.

With this embodiment, as mentioned above, an optimal Q-factor for the antenna resonance circuit 210 is set beforehand for communication at each of the five communication speeds. As shown in FIG. 4, the memory 262 stores the Q-factor changing table information defining the relations of correspondence between the communication speeds and the Q-factor settings. That is, the higher the communication speed, the smaller the Q-factor established.

Since the Q-factor for the antenna resonance circuit 210 is set to be smaller the higher the communication speed in effect, it is possible to raise the reception level at which a certain degree of reception is guaranteed over the entire spectral bandwidth of modulated waves at high communication speeds. This in turn translates into stable communication being carried out.

The modulation circuit 263 generates and outputs an outgoing signal (modulation signal) in which is modulated the information to be transmitted to the reader/writer 100. The outgoing signal output from the modulation circuit 263 is fed to the load modulation circuit 230.

The load modulation circuit 230 is constituted by a resistor 231 connected serially between the output terminals of the rectification circuit 220 and by a modulation transistor (FET) 232. The modulation transistor 232 is turned on and off by the outgoing signal output from the modulation circuit 263. This causes the outgoing signal output from the modulation circuit 263 to be data-modulated. The data-modulated outgoing signal is fed to the antenna resonance circuit 210 and thereby transmitted wirelessly.

The detection circuit 250 detects and acquires the incoming signal from the output of the rectification circuit 220. The detection circuit 250 converts the detection output from analog to digital format. The resulting digital signal is fed to the adaptive equalization circuit and demodulation circuit 264 of the signal processing section 260. The detection output of the detection circuit 250 is also supplied to the communication speed detection circuit 265.

The adaptive equalization circuit and demodulation circuit 264 is equivalent to the adaptive equalization circuit and demodulation circuit 174 of the reader/writer 100. The adaptive equalization and demodulation circuit 264 is a circuit block that demodulates the incoming signal while correcting any distortion that may have occurred in that signal over the wireless communication channel. An adaptive equalization circuit that constitutes part of the adaptive equalization circuit and demodulation circuit 264 will be discussed later in more detail.

The communication speed detection circuit 265 checks to determine at which of the above-mentioned five communication speeds the incoming signal has been transmitted. This circuit communication speed detection circuit 265 may be constituted illustratively as follows.

To demodulate the incoming signal at each of the five communication speeds discussed above requires installing a plurality of PLL (phase-locked loop) circuits that synchronize with the clock signal reproduced from each of these incoming signals.

In its first typical structure, the communication speed detection circuit 265 detects the communication speed in effect by determining which of the plurality of PLL circuits has acquired synchronization with the clock reproduced from the incoming signal.

In another structure, the communication speed detection circuit 265 may be constituted as follows. A detection circuit for detecting a synchronization signal SYNC of incoming packets may be provided regarding each of the above-mentioned five communication speeds at which incoming signals are transmitted.

Thus in its second typical structure, the communication speed detection circuit 265 detects the communication speed in effect by determining which of the plurality of synchronization signal detection circuits has detected the synchronization signal SYNC, thereby finding out the communication speed at which the incoming signal containing the synchronization signal SYNC is received.

Communication speed information Vc detected by the communication speed detection circuit 265 is fed to the control block 261 of the signal processing section 260. The control block 261 recognizes the communication speed in use from the communication speed information Vc sent from the communication speed detection circuit 265. The communication speed information Vc thus recognized is forwarded to the Q-factor changing circuit 266.

Upon receipt of the communication speed information from the control block 261, the Q-factor changing circuit 266 determines whether the communication speed has changed. On finding that a new communication speed is in effect, the Q-factor changing circuit 266 references the Q-factor changing table information in the memory 262 to recognize the Q-factor of the antenna resonance circuit 210 in effect at that communication speed.

The Q-factor changing circuit 266 determines whether the recognized Q-factor is different from the current Q-factor of the antenna resonance circuit 210. If the recognized Q-factor is found to be different, the Q-factor changing circuit 266 turns on/off the switch circuits 214SW1 through 214SWn in such a manner as to switch to the recognized Q-factor.

The function of the above-described Q-factor changing circuit 266 may be arranged to be part of the functionality of the control block 261.

<Adaptive Equalization Circuit>

It is common knowledge that as the distance between the antenna coil 111 of the reader/writer 100 and the antenna coil 211 of the transponder 200 is reduced and the coupling coefficient of their electromagnetic coupling is thereby increased, the effects of mutual interference between the two antenna coils grow, causing the frequency characteristic of the transmission channel to divide into two peaks.

In practice, the parameter governing the above-described phenomenon is defined by the coupling coefficient of the two antennas. Strictly speaking, the parameter is influenced not only by the distance between the antennas but also by their sizes and any misalignment between their center points. In this specification, however, it is assumed for purpose of explanation that the larger the coupling coefficient, the shorter the inter-antenna distance and that the smaller the coupling coefficient, the longer the inter-antenna distance.

FIG. 5 graphically shows the frequency characteristic of two antennas having their resonance point at a frequency of 13.56 MHz over varying inter-antenna distances. As shown in FIG. 5, the frequency characteristic of the transmission channel has a single peak when the inter-antenna distance is relatively long at 10 cm or 5 cm. When the inter-antenna distance is made shorter, the frequency characteristic of the transmission channel is divided into two peaks. The shorter the inter-antenna distance, the farther apart the divided peaks of the frequency.

As can be seen from FIG. 5, upon noncontact communication through electromagnetic coupling, the frequency characteristic of the transmission channel varies in a complex manner depending on the inter-antenna distance. Thus if the equalization circuit is used to correct distortion that may come into the incoming signal from the transmission channel, the equalization circuit cannot deal with such a complex frequency characteristic because the amplification factor of this circuit is fixed relative to the frequency.

In Japanese Priority Patent Application JP 2008-297629 (filed on Nov. 21, 2008), this applicant proposed an adaptive equalization technique for addressing the above-mentioned complex frequency characteristic. In this first embodiment of the present invention, the previously proposed adaptive equalization technique is applied to the adaptive equalization circuit outlined above.

Figure 6:
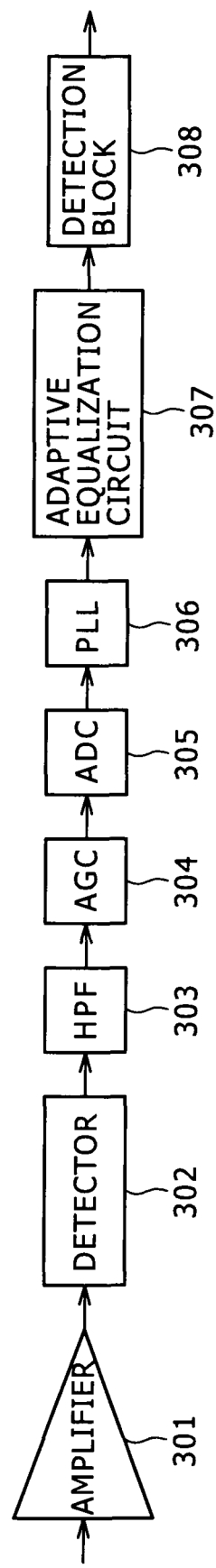
FIG. 6 is a schematic view showing a typical partial structure of the noncontact communication apparatus embodying the present invention.

FIG. 6 schematically shows a typical structure of a part made up of the detection circuit 250 and the adaptive equalization circuit. In this example, the part of the detection circuit 250 and adaptive equalization circuit includes an amplifier 301, a detector 302, an AGC (automatic gain control) circuit 304, a PLL circuit 306, an adaptive equalization circuit 307, and a detection block 308.

The incoming signal is amplified or attenuated by the amplifier 301 using an appropriate amplification factor or attenuation factor in a manner providing a sufficient amplitude for demodulation. In some cases, the amplifier 301 may be constituted by an attenuator or an AGC circuit.

The output of the amplifier 301 is fed to the detector 302. The detector 302 performs a detection process that extracts amplitude information from the output of the amplifier 301. That is, given reception information multiplexed on the carrier signal, the detector 302 analyzes envelope changes in the carrier signal to generate a detection signal containing the reception information.

The detection signal output from the detector 302 is forwarded to a high-pass filter 303. From the detection signal, the high-pass filter 303 removes the DC component setting the waveform midpoint potential to zero, whereby a detection waveform output devoid of the DC offset is generated.

The detection wave output rid of the DC offset by the high-pass filter 303 is fed to the AGC circuit 304 for gain control. The controlled output of the AGC circuit 304 is forwarded to an A/D conversion circuit 305 for conversion into a digital signal.

The digital signal from the A/D conversion circuit 305 is sent to the PLL circuit 306 whereby a clock is reproduced from the digital signal. The resulting signal is supplied to the adaptive equalization circuit 307.

The adaptive equalization circuit 307 performs a correction process that corrects distortion in the waveform of the incoming signal received via a transmission system having the frequency characteristic such as one shown in FIG. 5. Illustratively, the adaptive equalization circuit 307 is composed of a finite impulse response (FIR) digital filter. The adaptive equalization circuit 307 controls automatically (i.e., adaptively) the multiplication factor for each of the taps of the FIR digital filter in such a manner as to minimize the error in the detection output that should be obtained correctly as the output of the circuit 307.

The adaptive equalization circuit 307 can adaptively deal with steep changes in the frequency characteristic of the incoming signal over the transmission channel as illustrated in FIG. 5. Specifically, the output signal of the adaptive equalization circuit 307 is sent to the detection block 308. From the corrected digital signal coming from the adaptive equalization circuit 307, the detection block 308 detects binary signals of "1" and "0" as reception information and outputs the detected information.

Figure 33:
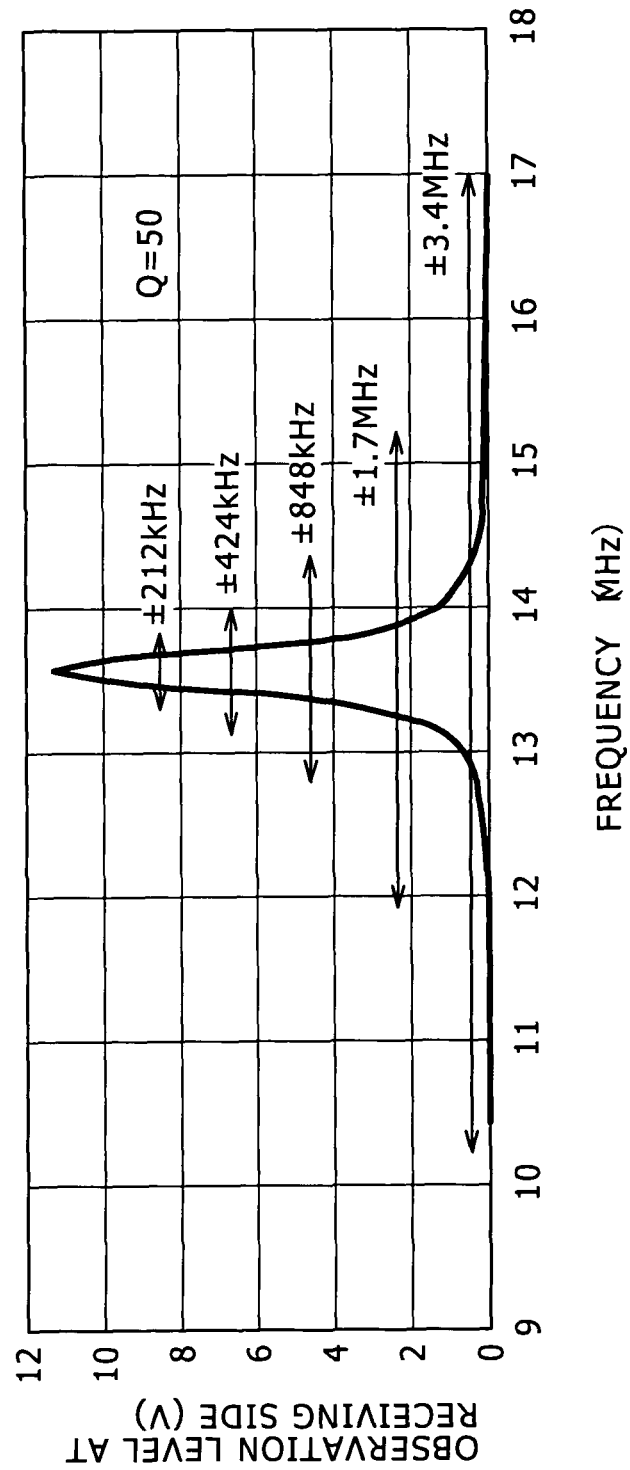
FIG. 33 is a graphic representation explanatory of the relations between resonance frequency characteristics and communication speeds regarding the antenna resonance circuit in the noncontact communication apparatus used by the ordinary noncontact communication system.

As shown in FIG. 33, the higher the communication speed, the wider the spectral bandwidth of the modulated wave. Since the frequency characteristic varies depending on the inter-antenna distance as illustrated in FIG. 5, the above-described adaptive equalization process tends to be complicated.

If the number of taps of the FIR digital filter can be increased and/or if a sufficiently prolonged processing time can be guaranteed with regard to the above-mentioned wide frequency band or complicated changes in characteristic, the adaptive equalization process above can deal with the distortion in reception waveform.

However, the above-described type of noncontact communication is a real-time process in which the adaptive equalization process needs to be settled at high speed. In many cases, the number of the taps of the FIR digital filter is limited because of the need for reducing the scope of digital circuitry.

For the reasons above, where there is a need for higher communication speeds as is the case with the first embodiment of this invention, the distortion of the reception waveform tends to be insufficiently corrected. This leads to the occurrence of a reception information detection error (i.e., communication error).

Figure 1:
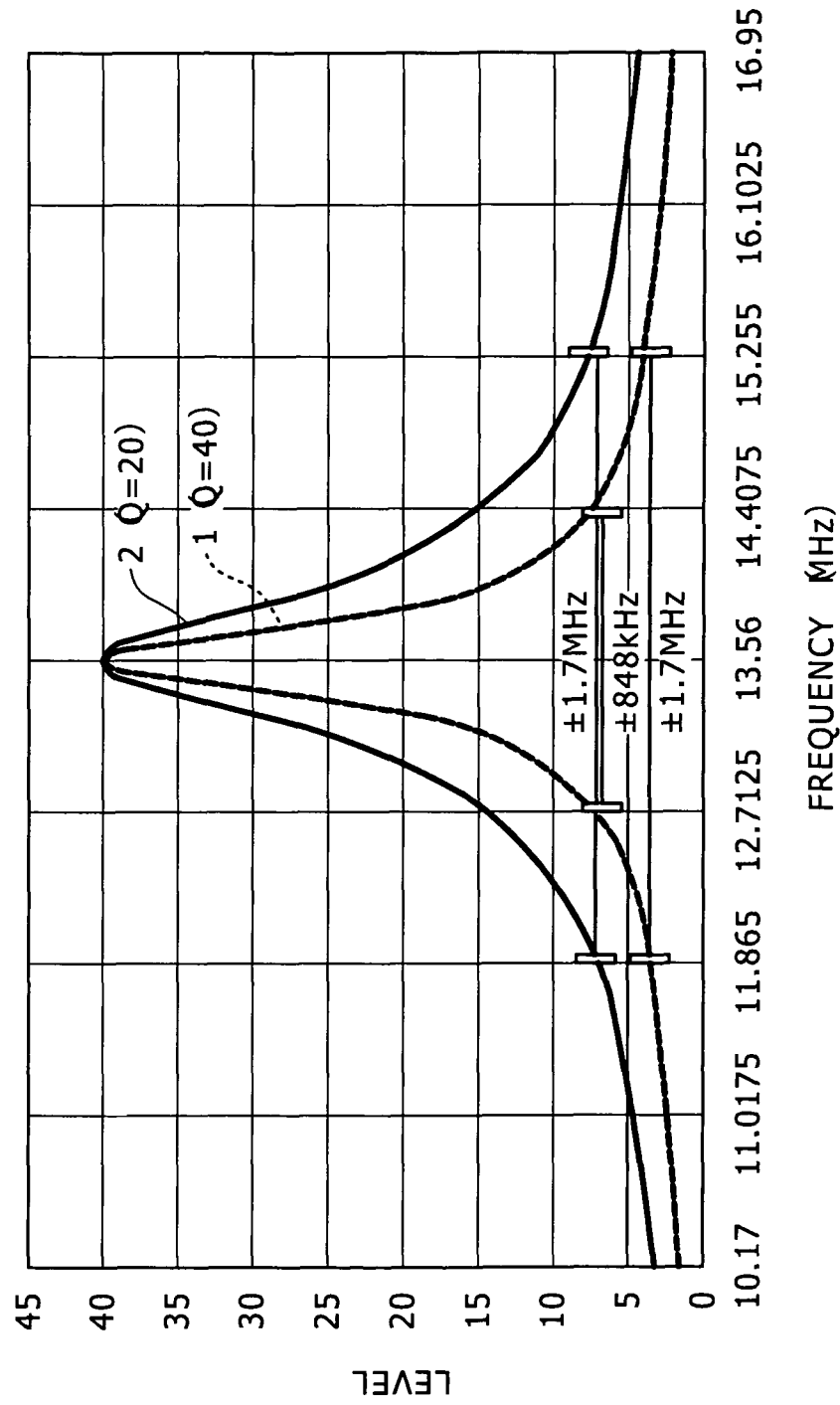
FIG. 1 is a frequency characteristic diagram explanatory of a key point of a noncontact communication method embodying the present invention.

By contrast, the Q-factor of the antenna resonance circuit (i.e., of the transmission channel) is varied depending on the communication speed in effect. The higher the communication speed, the smaller the Q-factor. Where the Q-factor is smaller, the frequency characteristic has a gentler gradient of attenuation at frequencies before and after a peaked resonance frequency as shown in FIG. 1.

As described, it is common knowledge that when the frequency characteristic has a gentler gradient of attenuation before and after the peak frequency, the distortion in the waveform can be corrected more easily. Thus the first embodiment exercises control in such a manner that the higher the communication speed in use, the smaller the Q-factor of the antenna resonance circuit is set to become. This makes it possible for the adaptive equalization circuit 307 to perform its adaptive equalization process effectively even at high communication speeds, thereby reducing communication errors.

When this embodiment, arrangements are made so that the higher the communication speed, the smaller the Q-factor of the antenna resonance circuit is controlled to be. This allows high-speed communication to take place between the reader/writer 100 and the transponder 200 even where the two parties are very close to each other. This type of communication has been difficult to achieve in ordinary setups.

<Processing Operations Upon Communication Between the Reader/writer 100 and the Transponder 200>

According to the specifications of FeliCa (registered trademark), the reader/writer 100 can output commands at varying communication speeds to the transponder 200 that is a noncontact IC card.

Figure 7:
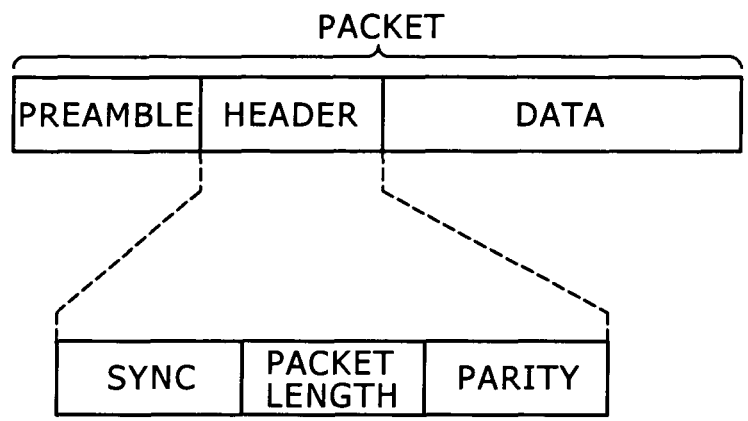
FIG. 7 is a schematic view showing a typical packet format in which packets are exchanged under a communication protocol applicable to the noncontact communication method embodying the present invention.

FIG. 7 shows the typical format of command packets to be exchanged between the reader/writer 100 and the transponder 200. A packet in this format includes a preamble, a header, and a data part. The header includes a synchronization signal SYNC, packet length information, and parity data for error detection and correction.

Figure 8:
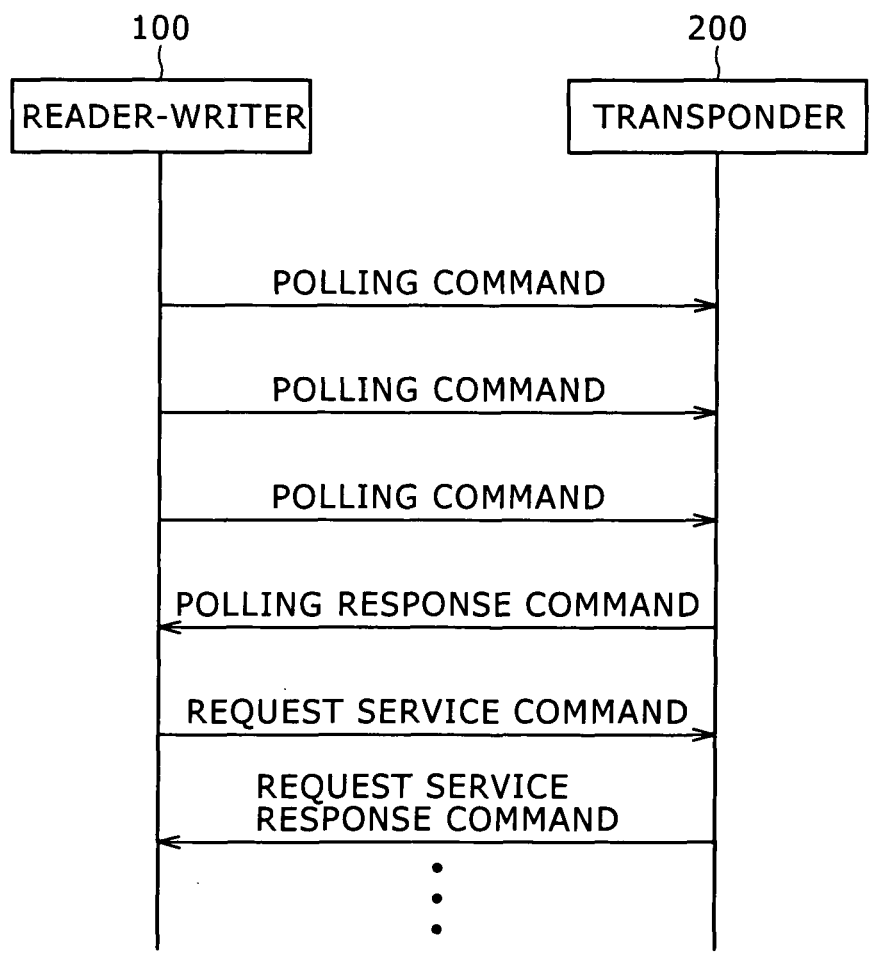
FIG. 8 is a sequence diagram showing a typical sequence in which packets are exchanged under the communication protocol applicable to the noncontact communication method embodying the present invention.

FIG. 8 is a sequence diagram showing a typical flow of packets following the start of communication under the protocol of FeliCa (registered trademark). First, the reader/writer 100 transmits a polling command repeatedly to the transponder (noncontact IC card) 200. When the transponder 200 returns a response (i.e., a polling response command) to the polling command, the reader/writer 100 transmits a request service command to the transponder 200.

Upon receipt of the request service command, the transponder 200 returns a response (i.e., a request service response command) to the reader/writer 100. After the exchanges of commands and their responses have been completed as described at the start of communication between the reader/writer 100 and the transponder 200, the communication of necessary information is carried out between the two parties.

With this embodiment, polling commands are output from the reader/writer 100 successively at varying communication speeds. Illustratively, the reader/writer 100 may output polling commands successively at communication speeds in descending order.

When a response command is returned from the transponder 200 in response to a transmitted polling command, the reader/writer 100 fixes the communication speed in effect at that point and outputs a request service command. The reader/writer 100 proceeds to communicate information with the transponder 200 at the communication speed thus fixed.

<Flow of Processing Operations Performed by the Reader/writer 100>

Figure 9:
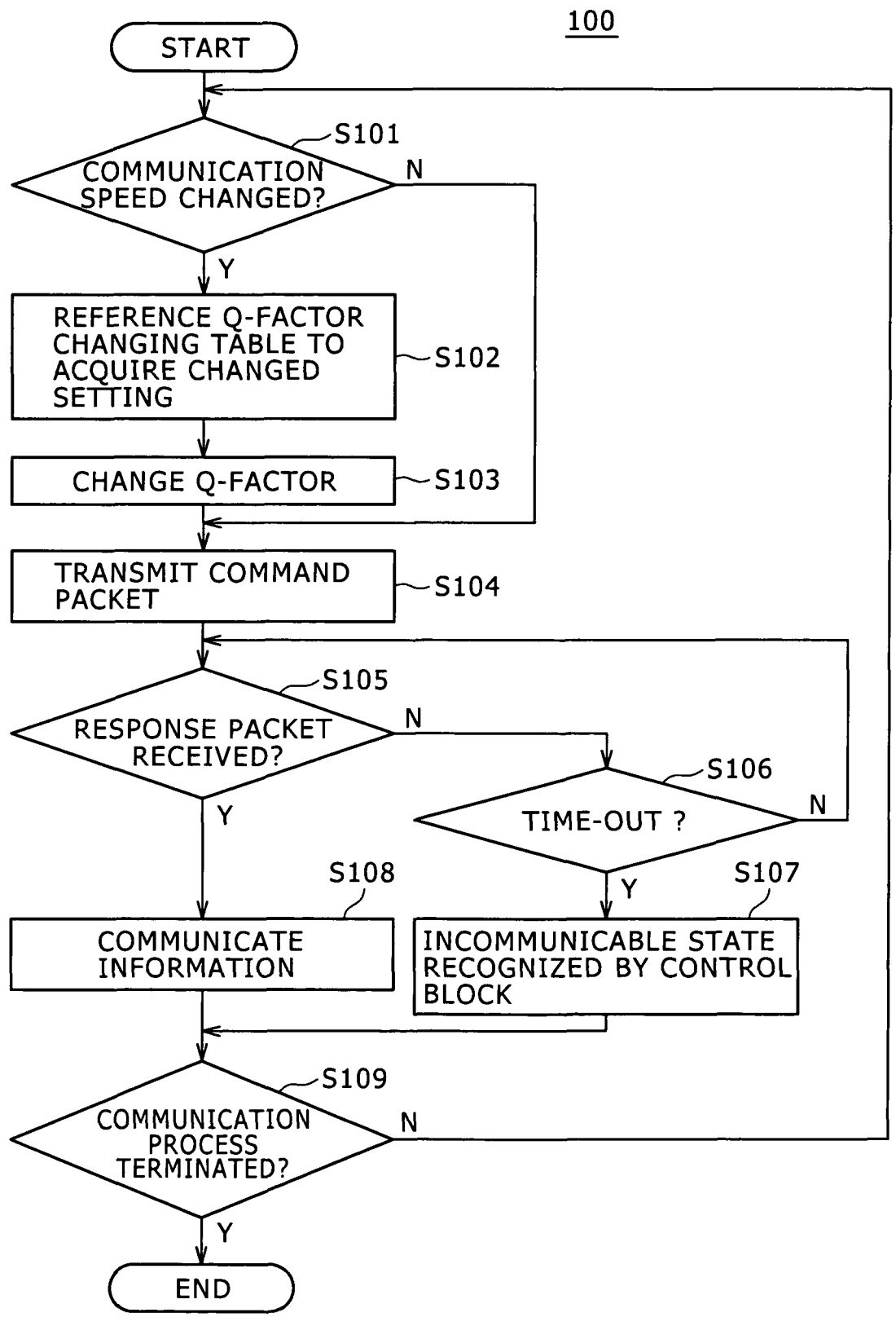
FIG. 9 is a flowchart explanatory of the processing steps performed by the reader/writer acting as the noncontact communication apparatus as part of the first embodiment of the present invention.

The flow of processing operations performed by the reader/writer 100 in the above setup will now be explained in reference to the flowchart of FIG. 9. The processing in FIG. 9 is executed under control of the control block 171. For purpose of explanation of FIG. 9, it is assumed that the control block 171 possesses the function of the Q-factor changing circuit 175 as well.

In step S101, the control block 171 checks to determine whether the communication speed has changed. If in step S101 the communication speed is found unchanged, then step S104 is reached. In step S104, the control block 171 transmits a polling command packet at the communication speed in effect at that point.

If in step S101 the communication speed is found to have changed, step S102 is reached. In step S102, the control block 171 references the Q-factor changing table information in the memory 172 to recognize (i.e., acquire) the Q-factor corresponding to the changed communication speed.

In step S103, the control block 171 turns on or off the switch circuits 114SW1 through 114SWn of the antenna resonance circuit 110 in such a manner as to switch to the recognized Q-factor. Step S103 is followed by step S104 in which the control block 171 transmits a polling command at the changed communication speed.

After outputting the polling command packet in step S104, the control block 171 goes to step S105. In step S105, the control block 171 checks to determine whether a response command packet is received from the transponder 200.

If in step S105 the response command packet is not found to be received, the control block 171 goes to step S106. In step S106, the control block 171 checks to determine whether the packet-unreceived state has exceeded a predetermined time period.

If in step S106 the state in which the response command packet is not received has yet to exceed the predetermined time period, the control block 171 returns to step S105. In step S105, the control block 171 waits for the response command packet to be received.

If in step S106 the state in which the response command packet has yet to arrive has exceeded the predetermined time period, the control block 171 goes to step S107. In step S107, the control block 171 recognizes an incommunicable state.

In step S109, the control block 171 checks to determine whether the communication process has come to an end. If in step S109 the communication process is not found to be terminated, then the control block 171 returns to step S101. If in step S109 the communication process is found to have ended, the control block 171 terminates the above-described processing routine.

If in step S105 the response command packet is found to be received from the transponder 200, the control block 171 goes to step S108. In step S108, the control block 171 communicates information with the transponder 200. The execution of the information communication includes exchanges of the above-described request service command and request service response command.

After step S108, the control block 171 goes to step S109 and checks to determine whether the communication process has come to an end. If the communication process is not found to be terminated, then step S101 is reached again. If in step S109 the communication process is found to have ended, the control block 171 terminates the above-described processing routine.

<Flow of Processing Operations Performed by the Transponder 200>

Figure 10:
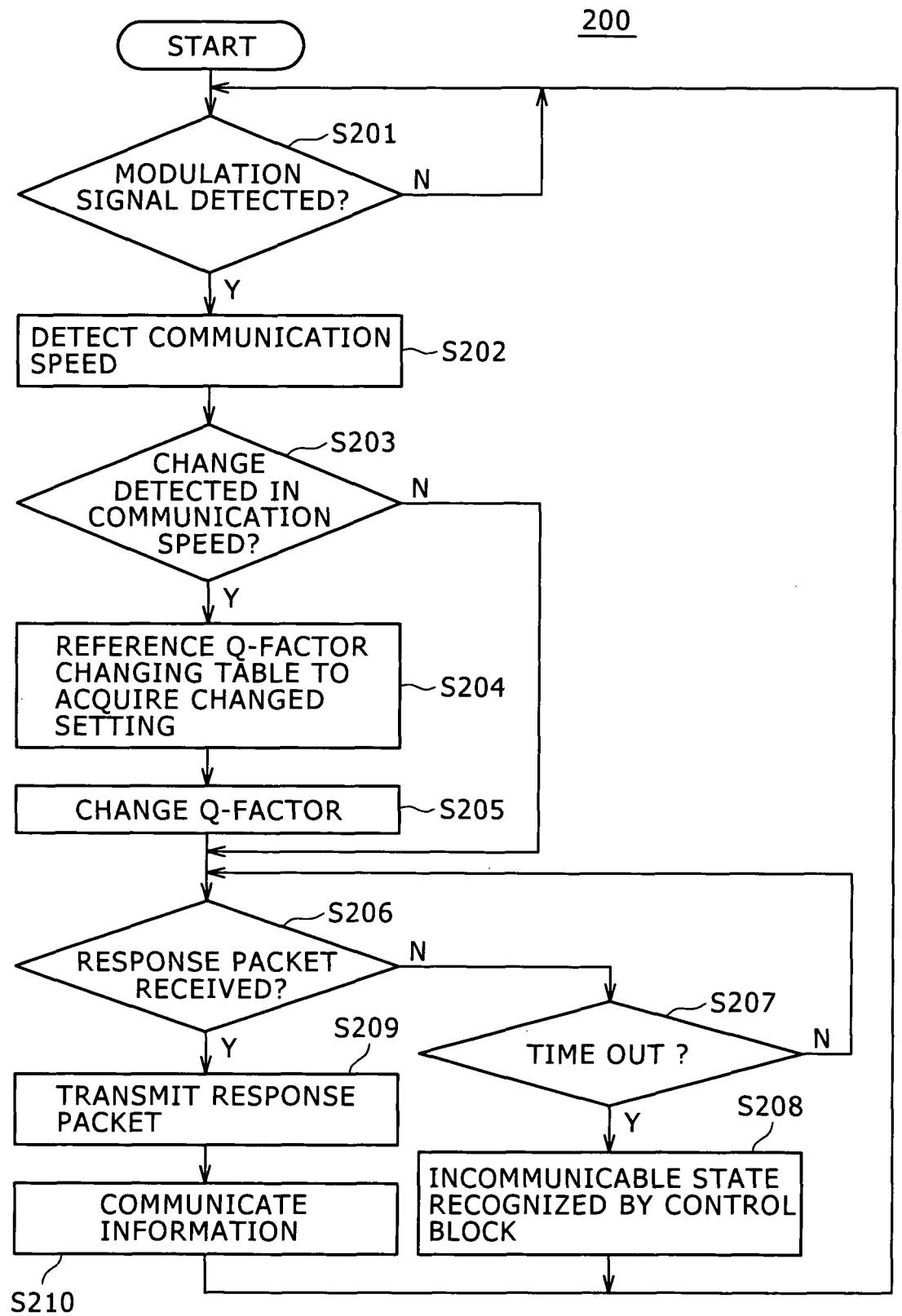
FIG. 10 is a flowchart explanatory of the processing steps performed by the transponder acting as the noncontact communication apparatus as part of the first embodiment of the present invention.

Explained below in reference to the flowchart of FIG. 10 is the flow of processing operations performed by the transponder 200 in conjunction with the processing operations carried out by the reader/writer 100. The processing in FIG. 10 is executed under control of the control block 261. For purpose of explanation of FIG. 10, it is assumed that the control block 261 possesses the function of the Q-factor changing circuit 266 as well.

In step S201, the control block 261 checks to determine whether a modulation signal is transmitted from the reader/writer 100. If the modulation signal is found to be detected, the control block 261 goes to step S202. In step S202, the control block 261 detects the communication speed sensed by the communication speed detection circuit 265.

In step S203, the control block 261 checks to determine whether the detected communication speed is different from the communication speed derived from the previously sensed demodulation signal. That is, the control block 261 determines whether the communication speed has changed.

If in step S203 the communication speed is found to have changed, the control block 261 goes to step S204. In step S204, the control block 261 references the Q-factor changing table information in the memory 262 to recognize (i.e., acquire) the Q-factor corresponding to the changed communication speed.

In step S205, the control block 261 turns on or off the switch circuits 214SW1 through 214SWn of the antenna resonance circuit 210 in such a manner as to switch to the recognized Q-factor. In step S206, the control block 261 waits for a command packet (i.e., a polling command packet) to be received from the reader/writer 100.

If in step S203 the communication speed is not found to have changed, the control block 261 goes to step S206 by bypassing steps S204 and 5205 leaving the Q-factor unchanged. In step S206, the control block 261 waits for the polling command packet to be received.

If in step S206 the polling command packet is not found to be received from the reader/writer 100, the control block 261 goes to step S207. In step S207, the control block 261 checks to determine whether the packet-unreceived state has exceeded a predetermined time period.

If in step S207 the state in which the polling command packet is not received has yet to exceed the predetermined time period, the control block 261 returns to step S206. In step S206, the control block 261 waits for the polling command packet to be received.

If in step S207 the state in which the polling command packet has yet to arrive has exceeded the predetermined time period, the control block 261 goes to step S208. In step S208, the control block 261 recognizes an incommunicable state. The control block 261 then returns to step S201 and repeats the subsequent steps.

If in step S206 the polling command packet is found to be received from the reader/writer 100, the control block 261 goes to step S209. In step S209, the control block 261 transmits a polling response command packet to the reader/writer 100. In step S210, the control block 261 of the transponder 200 communicates information with the reader/writer 100. The execution of the information communication includes exchanges of the above-described request service command and request service response command.

Thereafter, the control block 261 returns to step S201 and repeats the subsequent steps. The reader/writer 100 may change the communication speeds for polling command transmission not only in descending order as described above, but also in ascending order or in any other desired order.

Alternatively, the reader/writer 100 may transmit polling commands at all of a plurality of communication speeds determined beforehand. Of the communication speeds at which polling response commands were returned from the transponder 200, the highest speed may be selected and a request service command may be output at the selected speed.

As another alternative, upon receipt of a polling response command in response to a polling command transmitted at a low communication speed, the reader/writer 100 may not immediately start communicating information with the opposite party but may again output another polling command at a higher communication speed. If a polling response command is received in response to the polling command transmitted at the higher communication speed, the reader/writer 100 may proceed to communicate information with the opposite party at that higher speed.

[Second Embodiment]

With the first embodiment discussed above, communication is performed between the reader/writer 100 and the transponder 200 under the protocol defined for FeliCa (registered trademark). Alternatively, the protocol for communication between the reader/writer 100 and the transponder 200 may illustratively be ISO14443-4 or NFCIP-1 Transport Protocol, among others.

ISO14443-4 or NFCIP-1 Transport Protocol includes specifications requiring communication speeds to be changed after negotiations are conducted at the communication speed in effect before the speed change between two communicating parties using a speed change command and a speed change response command. The second embodiment of the present invention involves having noncontact communication conducted according to ISO14443-4 or NFCIP-1 Transport Protocol.

With the second embodiment, the hardware structure of the reader/writer 100 may be identical to that of the first embodiment shown in FIG. 2. On the other hand, the hardware structure of the transponder 200 is basically the same as that of the first embodiment shown in FIG. 3 except that the communication speed detection circuit 265 is not necessary. The reason for this is that there is no need for the communication speed detection circuit 265 to detect communication speeds since the transponder 200 of the second embodiment is notified of communication speeds by the reader/writer 100.

Described below are the typical flows of processing operations performed by the reader/writer 100 and transponder 200 constituting the second embodiment.

<Flow of Processing Operations Performed by the Reader/writer 100>

Figure 11:
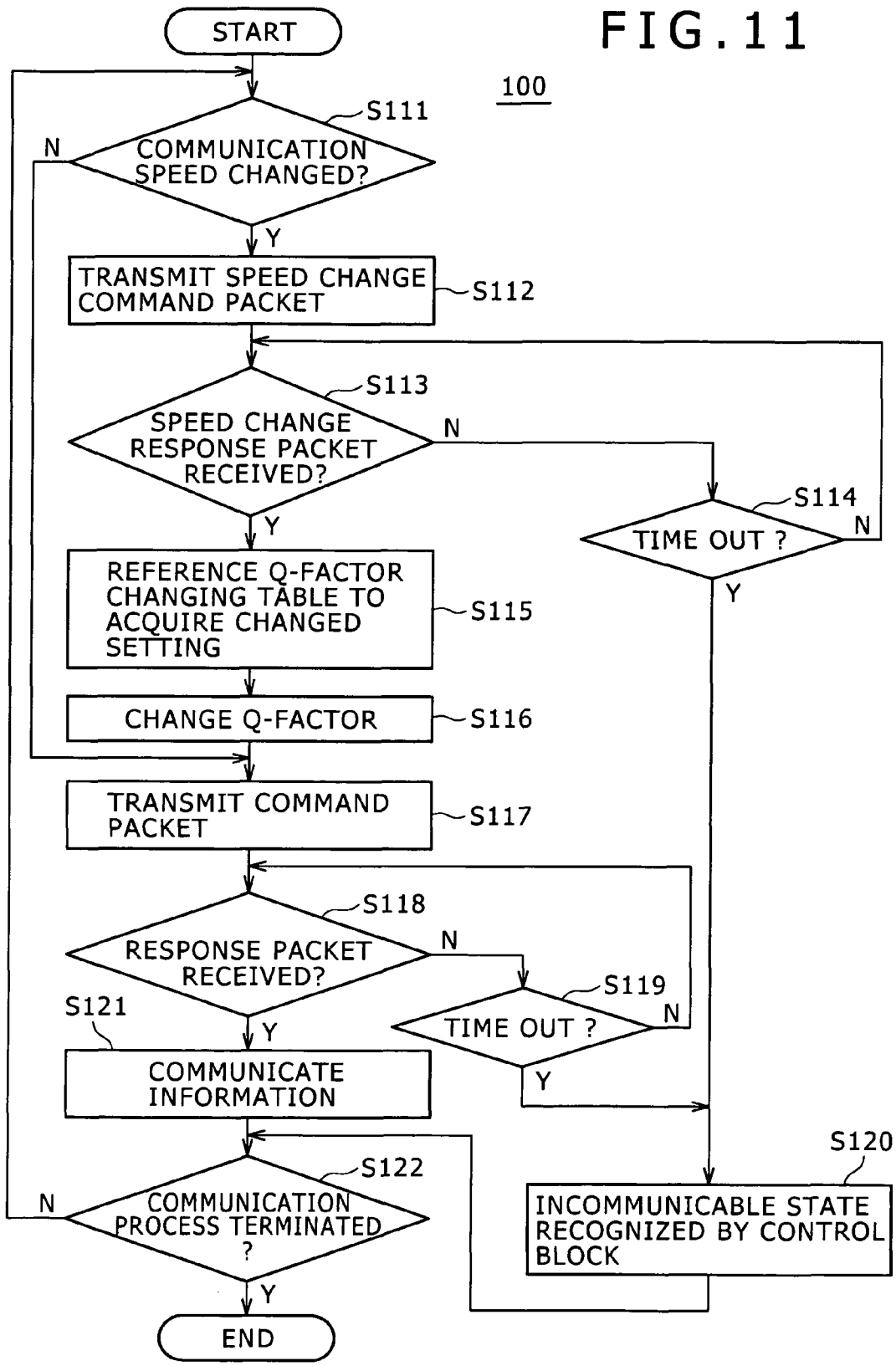
FIG. 11 is a flowchart explanatory of the processing steps performed by the reader/writer acting as the noncontact communication apparatus as part of a second embodiment of the present invention.

The flow of processing operations carried out by the reader/writer 100 of the second embodiment is explained below in reference to the flowchart of FIG. 11. The processing in FIG. 11 is executed under control of the control block 171. For purpose of explanation of FIG. 11, it is assumed that the control block 171 possesses the function of the Q-factor changing circuit 175 as well.

In step S111, the control block 171 checks to determine whether the communication speed has changed. If in step S111 the communication speed is found to be changed, the control block 171 goes to step S112. In step S112, the control block 171 outputs a speed change command packet. The Q-factor in effect at this point is either the largest of the five predetermined values or the Q-factor corresponding to the communication speed in use before the speed change.

In step S113, the control block 171 waits for a speed change response packet to be received in response to the transmitted speed change command packet. If in step S113 the speed change response command packet is found to be received, the control block 171 goes to step S115. In step S115, the control block 171 references the Q-factor changing table information in the memory 172 to recognize (i.e., acquire) the Q-factor corresponding to the changed communication speed.

In step S116, the control block 171 turns on or off the switch circuits 114SW1 through 114SWn of the antenna resonance circuit 110 in such a manner as to switch to the recognized Q-factor. In step S117, the control block 171 transmits a command packet at the changed communication speed.

After outputting the command packet in step S117, the control block 171 goes to step S118. In step S118, the control block 171 checks to determine whether a response packet is received from the transponder 200 in response to the transmitted command packet.

If in step S118 the response packet is not found to be received, the control block 171 goes to step S119. In step S119, the control block 171 checks to determine whether the packet-unreceived state has exceeded a predetermined time period.

If in step S119 the state in which the response packet is not received has yet to exceed the predetermined time period, the control block 171 returns to step S118. In step S118, the control block 171 waits for the response packet to be received.

If in step S119 the state in which the response packet has yet to arrive has exceeded the predetermined time period, the control block 171 goes to step S120. In step S120, the control block 171 recognizes an incommunicable state.

In step S122, the control block 171 checks to determine whether the communication process has come to an end. If in step S122 the communication process is not found to be terminated, then the control block 171 returns to step S111. If in step S122 the communication process is found to have ended, the control block 171 terminates the above-described processing routine.

If in step S118 the response packet is found to be received from the transponder 200, the control block 171 goes to step S121. In step S121, the control block 171 communicates information with the transponder 200.

After step S121, the control block 171 goes to step S122 and checks to determine whether the communication process has come to an end. If the communication process is not found to be terminated, then step S111 is reached again. If in step S122 the communication process is found to have ended, the control block 171 terminates the above-described processing routine.

If in step S111 the communication speed is found unchanged, then the control block 171 jumps to step S117 and transmits the command packet at the communication speed in effect at that point. The control block 171 then repeats the steps subsequent to step S117.

If in step S113 the speed change response packet is not found to be received, the control block 171 goes to step S114. In step S114, the control block 171 checks to determine whether the packet-unreceived state has exceeded a predetermined time period.

If in step S114 the state in which the response packet is not received has yet to exceed the predetermined time period, the control block 171 returns to step S113. In step S113, the control block 171 waits for the speed change response packet to be received.

If in step S114 the state in which the response packet has yet to arrive has exceeded the predetermined time period, the control block 171 goes to step S120. In step S120, the control block 171 recognizes an incommunicable state. The control block 171 then repeats the steps subsequent to step S120.

<Flow of Processing Operations Performed by the Transponder 200>

Figure 12:
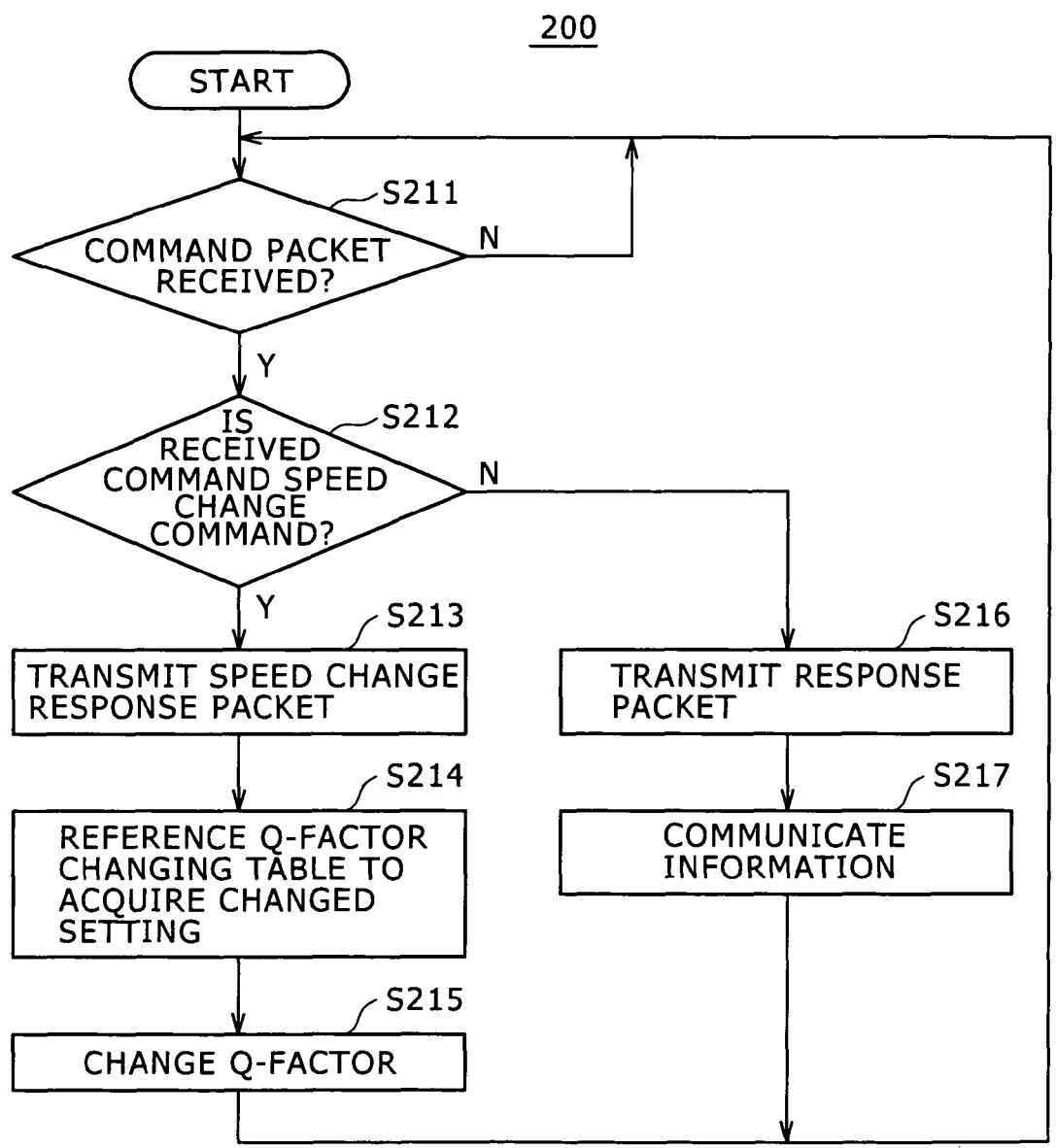
FIG. 12 is a flowchart explanatory of the processing steps performed by the transponder acting as the noncontact communication apparatus as part of the second embodiment of the present invention.

Explained below in reference to the flowchart of FIG. 12 is the flow of processing operations carried out by the transponder 200 of the second embodiment in conjunction with the processing operations performed by the reader/writer 100. The processing in FIG. 12 is executed under control of the control block 261. For purpose of explanation of FIG. 12, it is assumed that the control block 261 possesses the function of the Q-factor changing circuit 266 as well.

In step S211, the control block 171 checks to determine whether a command packet is received from the reader/writer 100. The Q-factor in effect at this point is either the largest of the five predetermined values or the Q-factor corresponding to the communication speed in use before the speed change.

If in step S211 the command packet is found to be received, the control block 261 goes to step S212. In step S212, the control block 261 checks to determine whether the received command packet is a speed change command packet.

If in step S212 the received command packet is found to be the speed change command packet, the control block 261 goes to step S213. In step S213, the control block 261 outputs a speed change response packet. In step S214, the control block 261 references the Q-factor changing table information in the memory 262 to recognize (i.e., acquire) the Q-factor corresponding to the communication speed designated by the speed change command packet.

In step S215, the control block 261 turns on or off the switch circuits 214SW1 through 214SWn of the antenna resonance circuit 210 in such a manner as to switch to the recognized Q-factor. After step 215, the control block 261 returns to step S211 and waits for a command packet to be received.

If in step S212 the received command packet is not found to be the speed change command packet, the control block 261 goes to step S216. In step S216, the control block 261 determines that the command packet transmitted by the reader/writer 100 in step S117 earlier is received, and outputs a response packet accordingly.

In step S217, the control block 261 of the transponder 200 communicates information with the reader/writer 100. The control block 261 then returns to step S211 and repeats the subsequent steps.

The second embodiment provides the same effects as those offered by the first embodiment discussed above. The second embodiment may have the communication speed change notice output illustratively at the lowest of the predetermined communication speeds, with the Q-factor set to be a correspondingly large value.

[Third Embodiment]

In the first and the second embodiments discussed above, the Q-factor of the antenna resonance circuit is reduced during high-speed communication. This allows high-speed communication to be conducted between the reader/writer 100 and the transponder 200 even when the antennas of the two parties are very close to each other. This type of communication has been difficult to achieve in ordinary setups. On the other hand, when the Q-factor is reduced, the maximum communicable distance is inevitably shortened.

If the inter-antenna distance is sufficiently long for communication between a given reader/writer 100 and the transponder 200, data exchange between the two parties is made available without the Q-factor being set to be smaller than in ordinary setups. In such a case, if the Q-factor is reduced based on the communication speed information alone as with the first and the second embodiments, there may arise a trade-off between the availability of the communication over a shorter distance which is used to be unavailable in the ordinary setups and the unavailability of the communication over a longer distance which used to be available in the ordinary setups.

If the control block of the reader/writer 100 and that of the transponder 200 can detect the inter-antenna distance between the two parties, it is conceivable to keep the Q-factor as large as possible over long distances. This point is taken into consideration with the third embodiment of the present invention.

Figure 13:
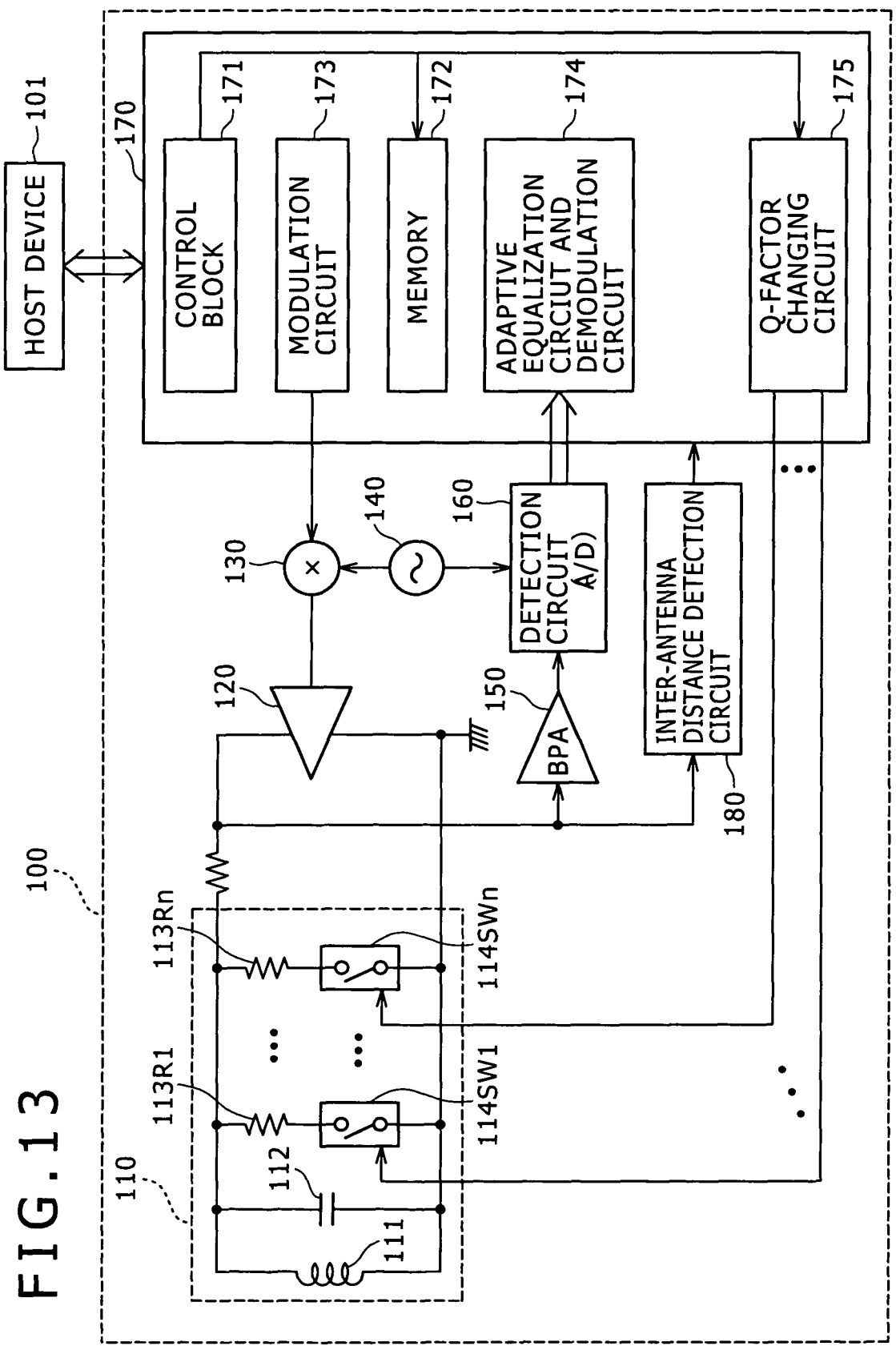
FIG. 13 is a block diagram showing a typical structure of the reader/writer acting as the noncontact communication apparatus as part of a third embodiment of the present invention.
Figure 14:
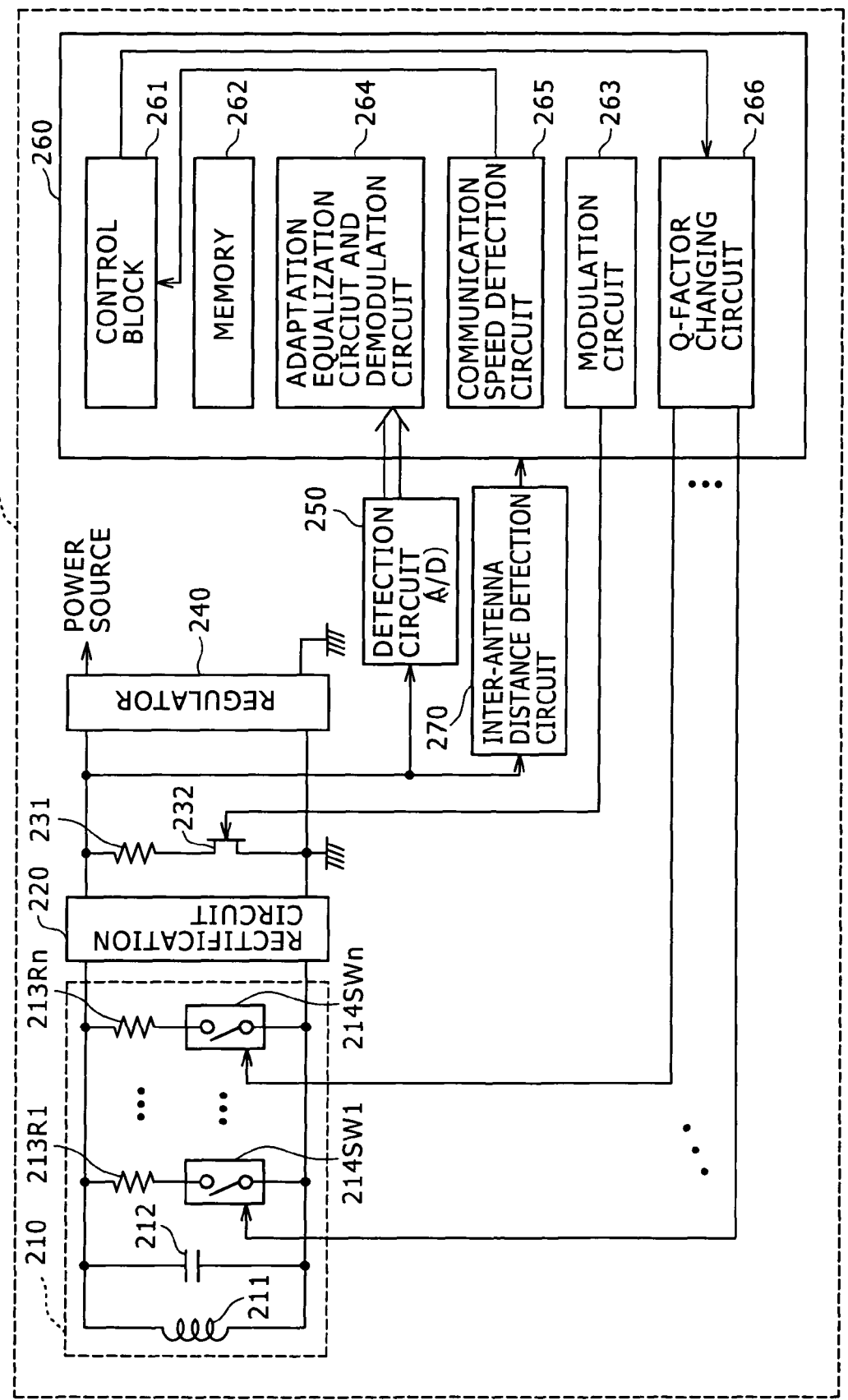
FIG. 14 is a block diagram showing a typical structure of the transponder acting as the noncontact communication apparatus as part of the third embodiment of the present invention.

FIG. 13 is a block diagram showing a typical structure of the reader/writer 100 as part of the third embodiment. FIG. 14 is a block diagram showing a typical structure of the transponder 200 as part of the third embodiment.

As shown in FIG. 13, the reader/writer 100 of the third embodiment has an inter-antenna distance detection circuit 180 connected interposingly between the antenna resonance circuit 110 and the transmission amplifier 120. Information representing the inter-antenna distance detected by the inter-antenna distance detection circuit 180 is fed to the control block 171 of the signal processing section 170.

With the third embodiment, the control block 171 varies the Q-factor depending not only on the communication speed in use but also on the inter-antenna distance in effect. For this reason, the reader/writer 100 of the third embodiment has different Q-factor changing table information stored in the memory 172 than the information for the first and the second embodiments discussed above. Because the third embodiment has the Q-factor varied with communication speed as well as with inter-antenna distance, the Q-factor changing table information is made up of combinations of communication speeds with inter-antenna distances on the one hand, and the Q-factors corresponding to these combinations on the other hand.

FIG. 15 shows in tabular form typical Q-factor changing table information for use by the third embodiment. In the example of FIG. 15, there are five boundary (i.e., threshold) inter-antenna distances at which the Q-factor is changed: 0.5 mm, 6 mm, 30 mm, 50 mm, and 100 mm. The table of FIG. 15 indicates the Q-factor settings in effect for a plurality of inter-antenna distances delimited by the threshold distances.

As shown in FIG. 15, regardless of the inter-antenna distance in effect, the largest Q-factor of 32 is set for the low communication speeds 212 kbps and 424 kbps from among the five communication speeds listed.

At the communication speed of 848 kbps, the Q-factor is set to 32 if the inter-antenna distance is longer than 0.5 mm; the Q-factor is changed to 24 if the inter-antenna distance is equal to or shorter than 0.5 mm.

At the communication speed of 1.7 Mbps, the Q-factor is set to 32 if the inter-antenna distance is longer than 6 mm. The Q-factor is changed to 24 if the inter-antenna distance is equal to or shorter than 6 mm and longer than 0.5 mm. The Q-factor is further changed to 16 if the inter-antenna distance is equal to or shorter than 0.5 mm.

At the communication speed of 3.4 Mbps, the Q-factor is set to 32 if the inter-antenna distance is longer than 30 mm. At this communication speed, the Q-factor is changed to 24 if the inter-antenna distance is equal to or shorter than 30 mm and longer than 6 mm; the Q-factor is changed to 16 if the inter-antenna distance is equal to or shorter than 6 mm and longer than 0.5 mm; and the Q-factor is further changed to 8 if the inter-antenna distance is equal to or shorter than 0.5 mm.

The other features of the structure of the reader/writer 100 as part the third embodiment are the same those of the reader/writer 100 constituting part of the first embodiment.

As shown in FIG. 14, the transponder 200 of the third embodiment has an inter-antenna distance detection circuit 270 attached to the output terminal of the rectification circuit 220. Inter-antenna distance information detected by the inter-antenna distance detection circuit 270 is fed to the control block 261 of the signal processing section 260.

In the third embodiment, the control block 261 varies the Q-factor depending not only on communication speed but also on inter-antenna distance. For this reason, the transponder 200 of the third embodiment is furnished with the Q-factor changing table information stored which, held in the memory 262, is made up of combinations of communication speeds with inter-antenna distances on the one hand, and the Q-factors corresponding to these combinations on the other hand as indicated in FIG. 15.

The other features of the structure of the transponder 200 as part the third embodiment are the same those of the transponder 200 constituting part of the first embodiment.

If ISO14443-4 or NFCIP-1 Transport Protocol used by the second embodiment is also utilized by the third embodiment as the latter's communication protocol, then there is no need for the communication speed detection circuit 265 as was the case with the second embodiment.

<Typical Methods for Detecting the Inter-antenna Distance>
<<Detection Method Using Carrier Intensity>>

When approached by the transponder (e.g., noncontact IC card) having a resonance characteristic, the reader/writer 100 reduces the output intensity of the carrier it generates. Detecting the value of the carrier output intensity thus allows the transponder to detect the inter-antenna distance relative to the approaching transponder.

If the input impedance value of the transponder (noncontact IC card) is known beforehand typically from system specifications, then it is possible to estimate the absolute value of the inter-antenna distance accordingly. The inter-antenna distance detection circuit 180 detects the inter-antenna distance by monitoring the resonance voltage of the antenna resonance circuit 110, and forwards the detection output to the control block 171 of the signal processing section 170.

Meanwhile, when the transponder (noncontact IC card) 200 is approached by the reader/writer 100 generating the carrier, the output voltage value of the rectification circuit 220 rises. If the output carrier level of the reader/writer 100 is known beforehand typically from system specifications, then it is possible to estimate the absolute value of the inter-antenna distance accordingly.

The inter-antenna distance detection circuit 270 detects the inter-antenna distance by monitoring the output voltage value of the rectification circuit 220. The detection output thus obtained is sent to the control block 261 of the signal processing section 260.

<<Detection Method Using the Resonance Frequency>>

When the antenna of the reader/writer 100 and that of the transponder 200 come close to each other, the resonance frequency of the current flowing through each antenna tends to deviate higher than the predetermined resonance frequency for the antenna resonance circuit of the antenna in question. Detecting the width of such deviation of the resonance frequency enables the reader/writer 100 and transponder 200 to sense changes in the inter-antenna distance relative to each other. If the antenna characteristics of the opposite device are known beforehand typically from system specifications, then it is possible for each device to estimate the absolute value of the inter-antenna distance.

In this case, the inter-antenna distance detection circuits 180 and 270 are each composed of a frequency discrimination circuit that discriminates the resonance frequency of the antenna resonance circuit 110 or 210. Based on the discriminated frequency, the inter-antenna distance is detected. Information representing the detected inter-antenna distance is forwarded to the control blocks 171 and 261 of the signal processing sections 170 and 260 respectively.

<Flow of Processing Operations Performed by the Reader/writer 100>

Figure 16:
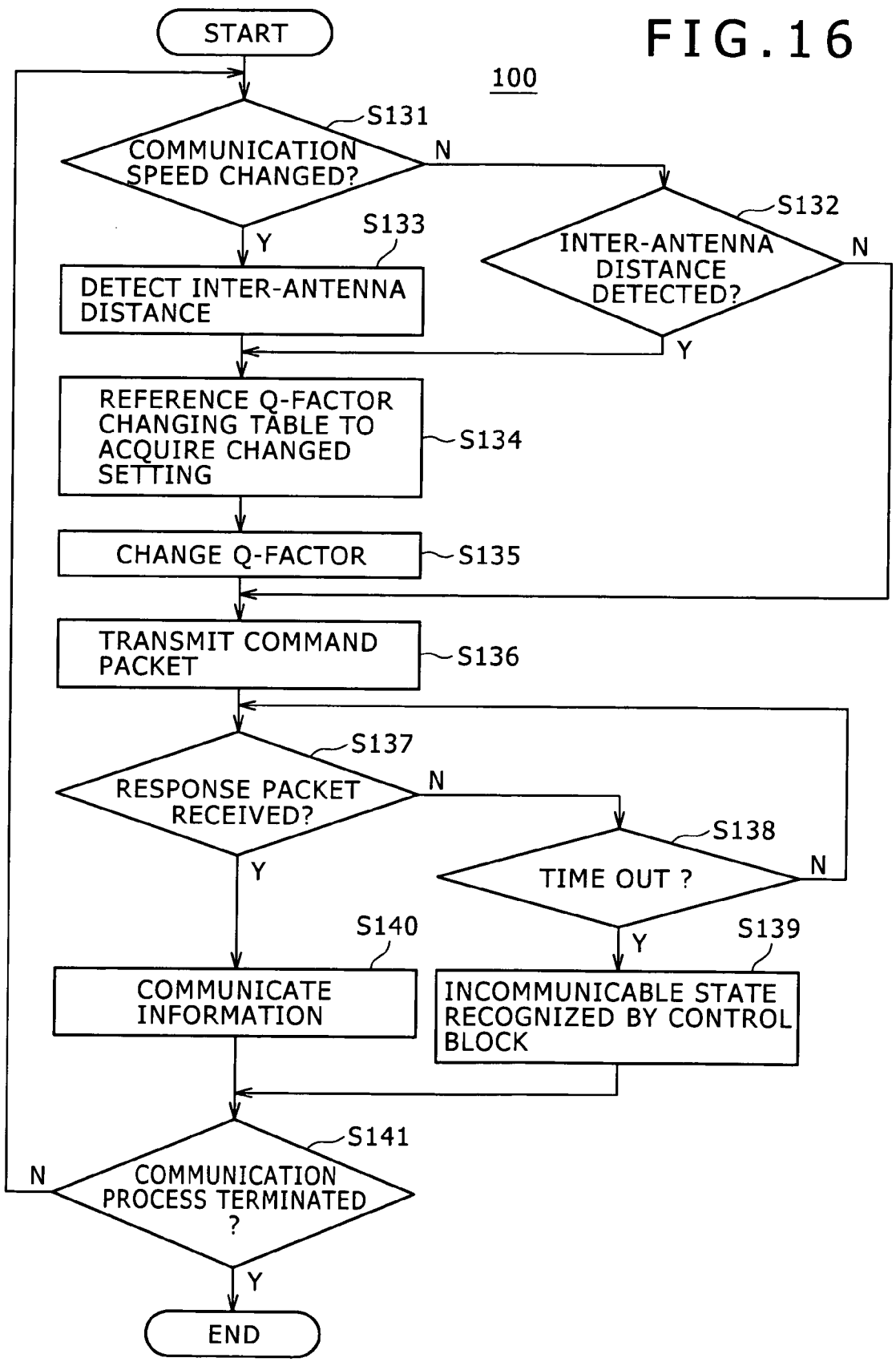
FIG. 16 is a flowchart explanatory of the processing steps performed by the reader/writer acting as the noncontact communication apparatus as part of the third embodiment of the present invention.

The flow of processing operations carried out by the reader/writer 100 of the third embodiment is explained below in reference to the flowchart of FIG. 16. The processing in FIG. 16 is executed under control of the control block 171. For purpose of explanation of FIG. 16, it is assumed that the control block 171 possesses the function of the Q-factor changing circuit 175 as well.

In step S131, the control block 171 checks to determine whether the communication speed has changed. If in step S131 the communication speed is not found to be changed, the control block 171 goes to step S132. In step S132, the control block 171 checks to determine whether the inter-antenna distance has changed so much as to exceed the applicable threshold distances in the above-described Q-factor changing table, based on the detection output of the inter-antenna distance detection circuit 180.

If in step S132 the inter-antenna distance is not found to have changed in a manner exceeding the applicable threshold distances in the Q-factor changing table, the control block 171 goes to step S136. In step S136, the control block 171 transmits a polling command packet while keeping the current communication speed and Q-factor unchanged.

If in step S131 the communication speed is found to be changed, the control block 171 goes to step S133. In step S133, the control block 171 recognizes the inter-antenna distance based on the detection output of the inter-antenna distance detection circuit 180. In step S134, the control block 171 references the Q-factor changing table information in the memory 172 to recognize (acquire) the Q-factor corresponding to the changed communication speed as well as to the recognized inter-antenna distance.

If in step S132 the inter-antenna distance is found to have changed in a manner exceeding the applicable threshold distances, the control block 171 also goes to step S134. In step S134, the control block 171 also references the Q-factor changing table information in the memory 172 to recognize (acquire) the Q-factor corresponding to the changed communication speed as well as to the recognized inter-antenna distance.

Step S134 is followed by step S135 in which the control block 171 turns on or off the switch circuits 114SW1 through 114SWn of the antenna resonance circuit 110 in such a manner as to switch to the recognized Q-factor. In step S136, the control block 171 transmits a polling command packet at the changed communication speed.

After transmitting the polling command packet in step S136, the control block 171 goes to step S137. In step S137, the control block 171 checks to determine whether a response command packet is received from the transponder 200.

If in step S137 the response command packet is not found to be received, the control block 171 goes to step S138. In step S138, the control block 171 checks to determine whether the packet-unreceived state has exceeded a predetermined time period.

If in step S138 the state in which the response command packet is not received has yet to exceed the predetermined time period, the control block 171 returns to step S137. In step S137, the control block 171 waits for the response command packet to be received.

If in step S138 the state in which the response command packet has yet to arrive has exceeded the predetermined time period, the control block 171 goes to step S139. In step S139, the control block 171 recognizes an incommunicable state.

In step S141, the control block 171 checks to determine whether the communication process has come to an end. If in step S141 the communication process is not found to be terminated, then the control block 171 returns to step S131. If in step S141 the communication process is found to have ended, the control block 171 terminates the above-described processing routine.

If in step S137 the response command packet is found to be received from the transponder 200, the control block 171 goes to step S140. In step S140, the control block 171 communicates information with the transponder 200. The execution of the information communication includes exchanges of the above-described request service command and request service response command.

After step S140, the control block 171 goes to step S141 and checks to determine whether the communication process has come to an end. If in step S141 the communication process is not found to be terminated, then step S131 is reached again. If in step S141 the communication process is found to have ended, the control block 171 terminates the above-described processing routine.

<Flow of Processing Operations Performed by the Transponder 200>

Figure 17:
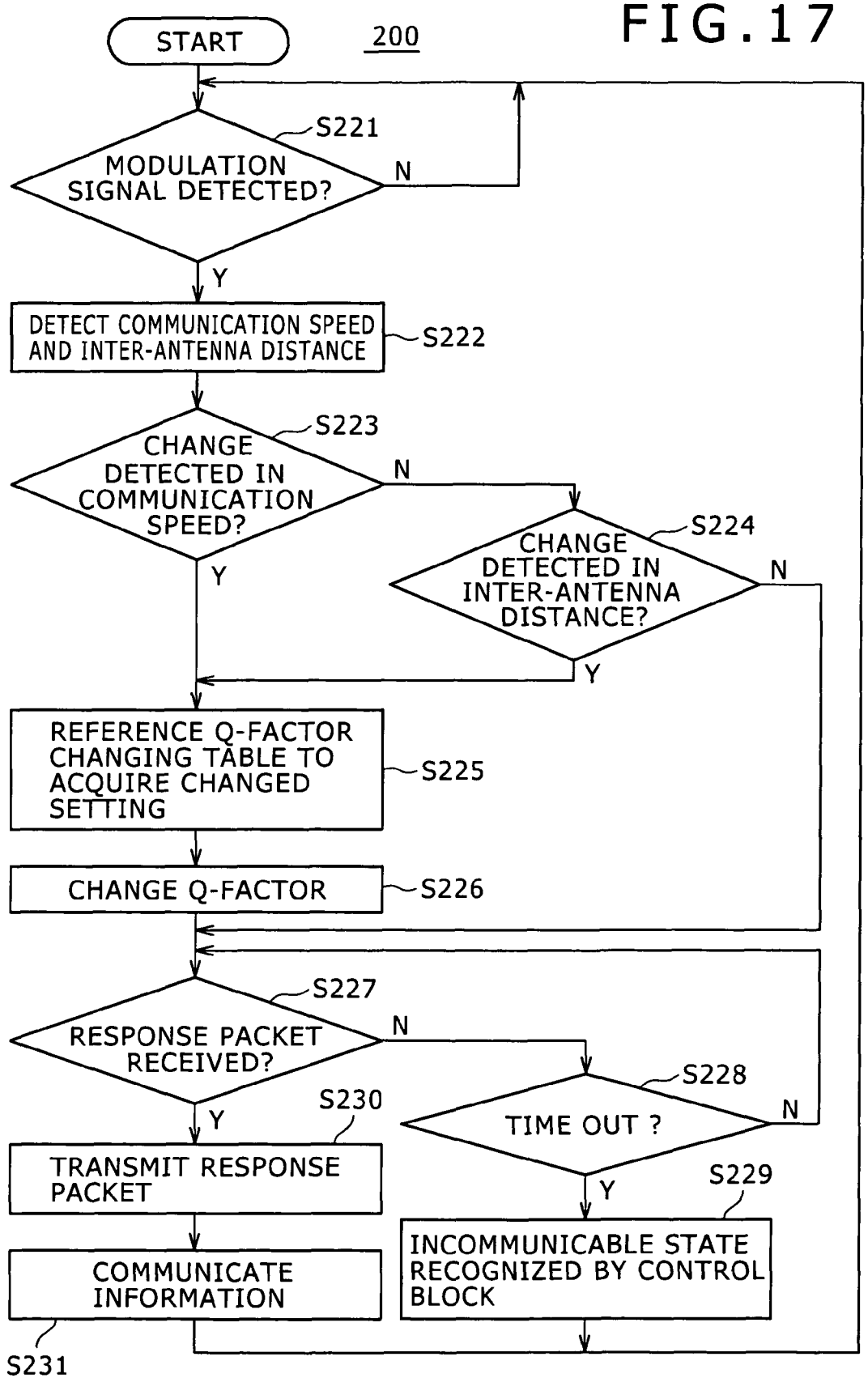
FIG. 17 is a flowchart explanatory of the processing steps performed by the transponder acting as the noncontact communication apparatus as part of the third embodiment of the present invention.

Explained below in reference to the flowchart of FIG. 17 is the flow of processing operations performed by the transponder 200 of the third embodiment in conjunction with the processing operations carried out by the reader/writer 100. The processing in FIG. 17 is executed under control of the control block 261. For purpose of explanation of FIG. 17, it is assumed that the control block 261 possesses the function of the Q-factor changing circuit 266 as well.

In step S221, the control block 261 checks to determine whether a modulation signal is transmitted from the reader/writer 100. If the modulation signal is found to be detected, the control block 261 goes to step S222. In step S222, the control block 261 detects the communication speed sensed by the communication speed detection circuit 265 and also detects the inter-antenna distance sensed by the inter-antenna distance detection circuit 270.

In step S223, the control block 261 checks to determine whether the detected communication speed is different from the communication speed derived from the previously sensed demodulation signal. That is, the control block 261 determines whether the communication speed has changed.

If in step S223 the communication speed is found to have changed, the control block 261 goes to step S225. In step S225, the control block 261 references the Q-factor changing table information in the memory 262 to recognize (acquire) the Q-factor corresponding to the changed communication speed as well as to the inter-antenna distance detected in step S222.

If in step S223 the communication speed is not found to be changed, the control block 261 goes to step S224. In step S224, the control block 261 checks to determine whether the inter-antenna distance has changed so much as to exceed the applicable threshold distances in the Q-factor changing table, based on the inter-antenna distance detected in step S222.

If in step S224 the inter-antenna distance is found to have changed in a manner exceeding the applicable threshold distances in the Q-factor changing table, the control block 261 goes to step S225. In step S225, the control block 261 references the Q-factor changing table information in the memory 262 to recognize (acquire) the Q-factor corresponding to the current communication speed as well as to the recognized inter-antenna distance.

After step S225, the control block 261 goes to step S226 and turns on or off the switch circuits 214SW1 through 214SWn of the antenna resonance circuit 210 in such a manner as to switch to the recognized Q-factor. In step S227, the control block 261 waits for a command packet (i.e., a polling command packet) to be received from the reader/writer 100.

If in step S224 the inter-antenna distance is not found to have changed in a manner exceeding the applicable threshold distances in the Q-factor changing table, the control block 261 goes to step S227 by bypassing steps S225 and S226 leaving the Q-factor unchanged. In step S227, the control block 261 waits for the polling command packet to be received.

If in step S227 the polling command packet is not found to be received from the reader/writer 100, the control block 261 goes to step S228. In step S228, the control block 261 checks to determine whether the packet-unreceived state has exceeded a predetermined time period.

If in step S228 the state in which the polling command packet is not received has yet to exceed the predetermined time period, the control block 261 returns to step S227. In step S227, the control block 261 waits for the polling command packet to be received.

If in step S228 the state in which the polling command packet has yet to arrive has exceeded the predetermined time period, the control block 261 goes to step S229. In step S229, the control block 261 recognizes an incommunicable state. The control block 261 then returns to step S221 and repeats the subsequent steps.

If in step S227 the polling command packet is found to be received from the reader/writer 100, the control block 261 goes to step S230. In step S230, the control block 261 transmits a polling response command packet to the reader/writer 100. In step S231, the control block 261 of the transponder 200 communicates information with the reader/writer 100. The execution of the information communication includes exchanges of the above-described request service command and request service response command. Thereafter, the control block 261 returns to step S221 and repeats the subsequent steps.

According to the third embodiment of the invention, the Q-factor is varied depending not only on the changed communication speed but also on the inter-antenna distance between the reader/writer 100 and the transponder 200. This makes it possible to keep the Q-factor large over long inter-antenna distances between the reader/writer 100 and the transponder 200 at high communication speeds. Hence the availability of the type of communication in effect when the inter-antenna distance is long even at elevated communication speeds.

[Fourth Embodiment: Another Typical Method for Detecting the Inter-antenna Distance in Connection with the Third Embodiment]

The fourth embodiment of the invention involves implementing another typical method for detecting the inter-antenna distance in connection with the third embodiment. In the fourth embodiment, the reader/writer 100 and the transponder 200 are each equipped with a distance detection sensor such as an optical sensor for detecting the inter-antenna distance. The inter-antenna distance is detected based on the sensor output of the distance detection sensor.

Figure 18:
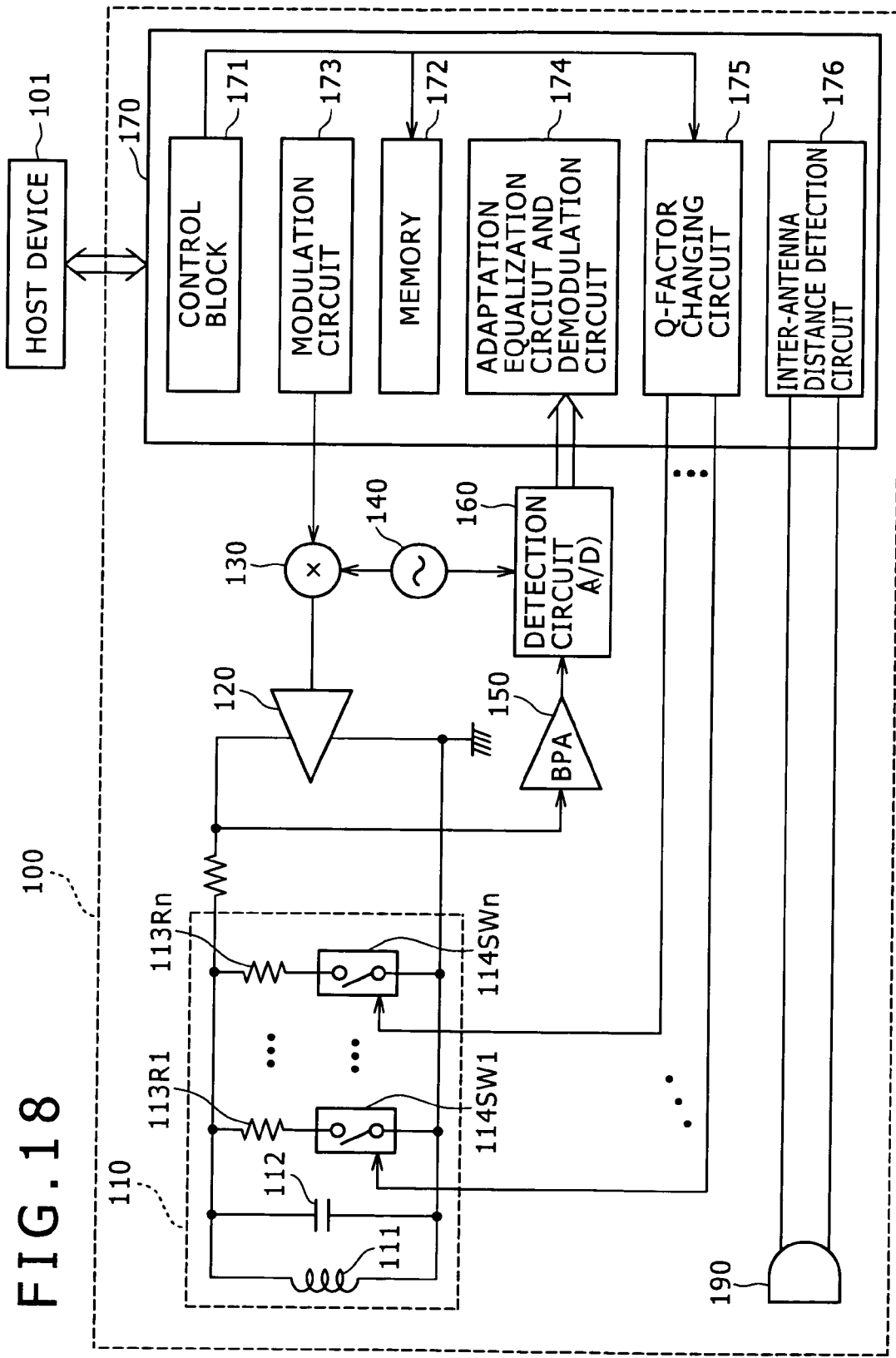
FIG. 18 is a block diagram showing a typical structure of the reader/writer acting as the noncontact communication apparatus as part of a fourth embodiment of the present invention.
Figure 19:
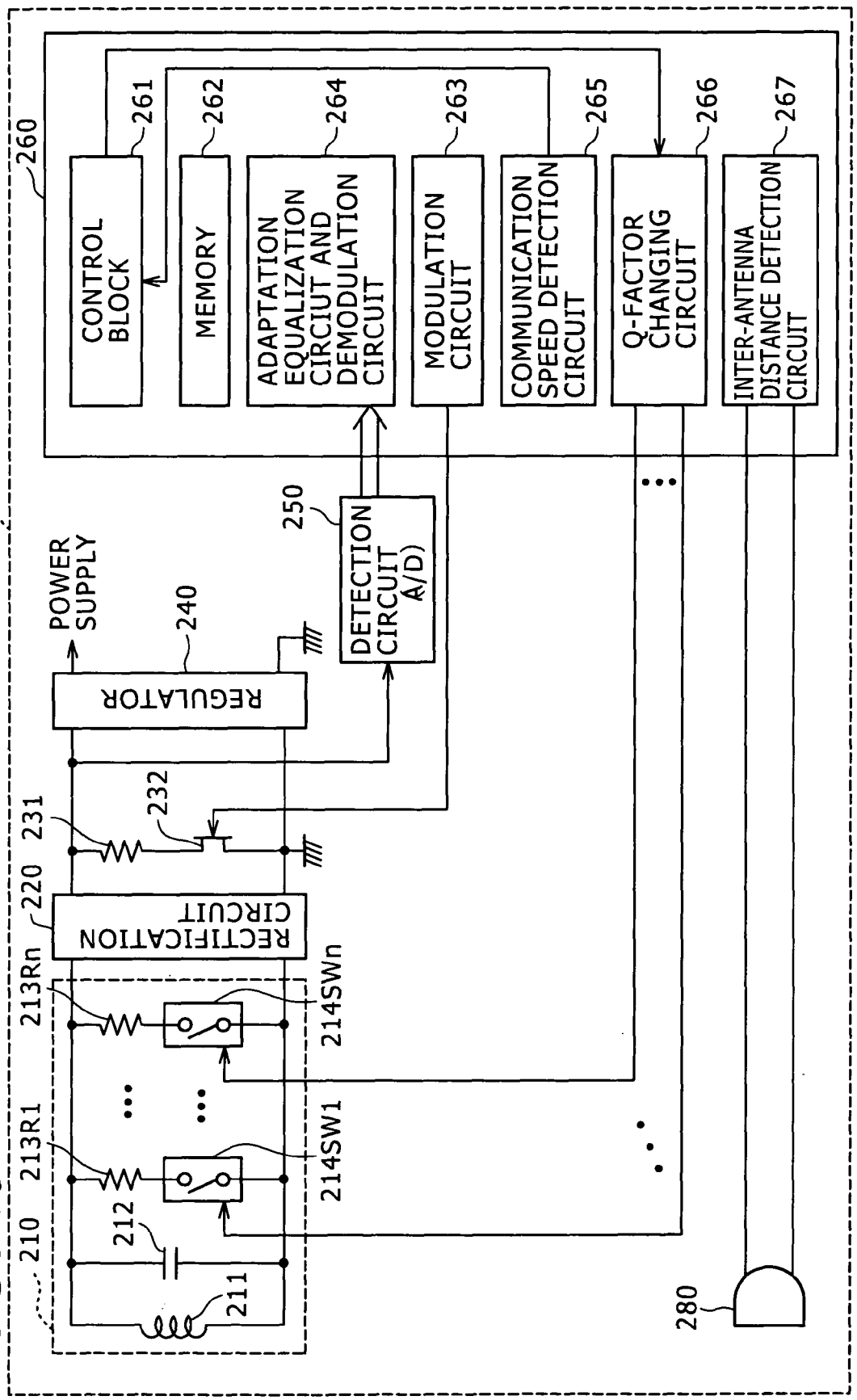
FIG. 19 is a block diagram showing a typical structure of the transponder acting as the noncontact communication apparatus as part of the fourth embodiment of the present invention.

FIG. 18 is a block diagram showing a typical structure of the reader/writer 100 as part of the fourth embodiment of the invention. FIG. 19 is a block diagram showing a typical structure of the transponder 200 as another part of the fourth embodiment.

As shown in FIG. 18, the reader/writer 100 includes a distance detection sensor 190 typically composed of an optical sensor. The signal processing section 170 contains an inter-antenna distance detection circuit 176 for detecting the inter-antenna distance from the sensor output of the distance detection sensor 190.

The control block 171 varies the Q-factor or performs other processes in exactly the same manner as with the above-described third embodiment through the use of information representing the inter-antenna distance detected by the inter-antenna distance detection circuit 176. Thus the inter-antenna distance detection circuit 180 found in the example of FIG. 13 is not provided for this example.

As shown in FIG. 19, the transponder 200 includes a distance detection sensor 280 composed of an optical sensor. The signal processing section 260 contains an inter-antenna distance detection circuit 267 for detecting the inter-antenna distance from the sensor output of the distance detection sensor 280.

The control block 261 varies the Q-factor or performs other processes in exactly the same manner as with the above-described third embodiment through the use of information representing the inter-antenna distance detected by the inter-antenna distance detection circuit 267. Thus the inter-antenna distance detection circuit 270 found in the example of FIG. 14 is not provided for this example.

The fourth embodiment provides the same effects as those offered by the third embodiment discussed above. As with the first embodiment, the above-described third and fourth embodiments are implemented by applying the present invention to the communication protocol specifications of FeliCa (registered trademark). However, it is obvious that the third and the fourth embodiments are also applicable to communications under ISO14443-4 or NFCIP-1 Transport Protocol as with the second embodiment.

[Fifth Embodiment]

As shown in FIG. 7, parity data is included in each communication packet exchanged between the reader/writer 100 and the transponder 200. Using the parity data, the reader/writer 100 and the transponder 200 are each capable of detecting communication errors upon packet reception.

There may be adopted one of two major methods for detecting communication errors using parity data: error detection using CRCC (cyclic redundancy check code), or error detection and correction using ECC (error checking and correcting) code. It is also possible to detect communication errors by determining whether the patterns of synchronization signals SYNC in communication packets coincide with one another.

According to the communication protocol specifications of FeliCa (registered trademark), a command sequence process such as one shown in FIG. 8 (called the transaction in this example) is carried out. In this case, if a communication error is detected by the reader/writer 100 or by the transponder 200 upon packet reception, the transaction is discarded. Upon elapse of a suitable time-out period, the packet is retransmitted from the reader/writer 100.

Figure 20:
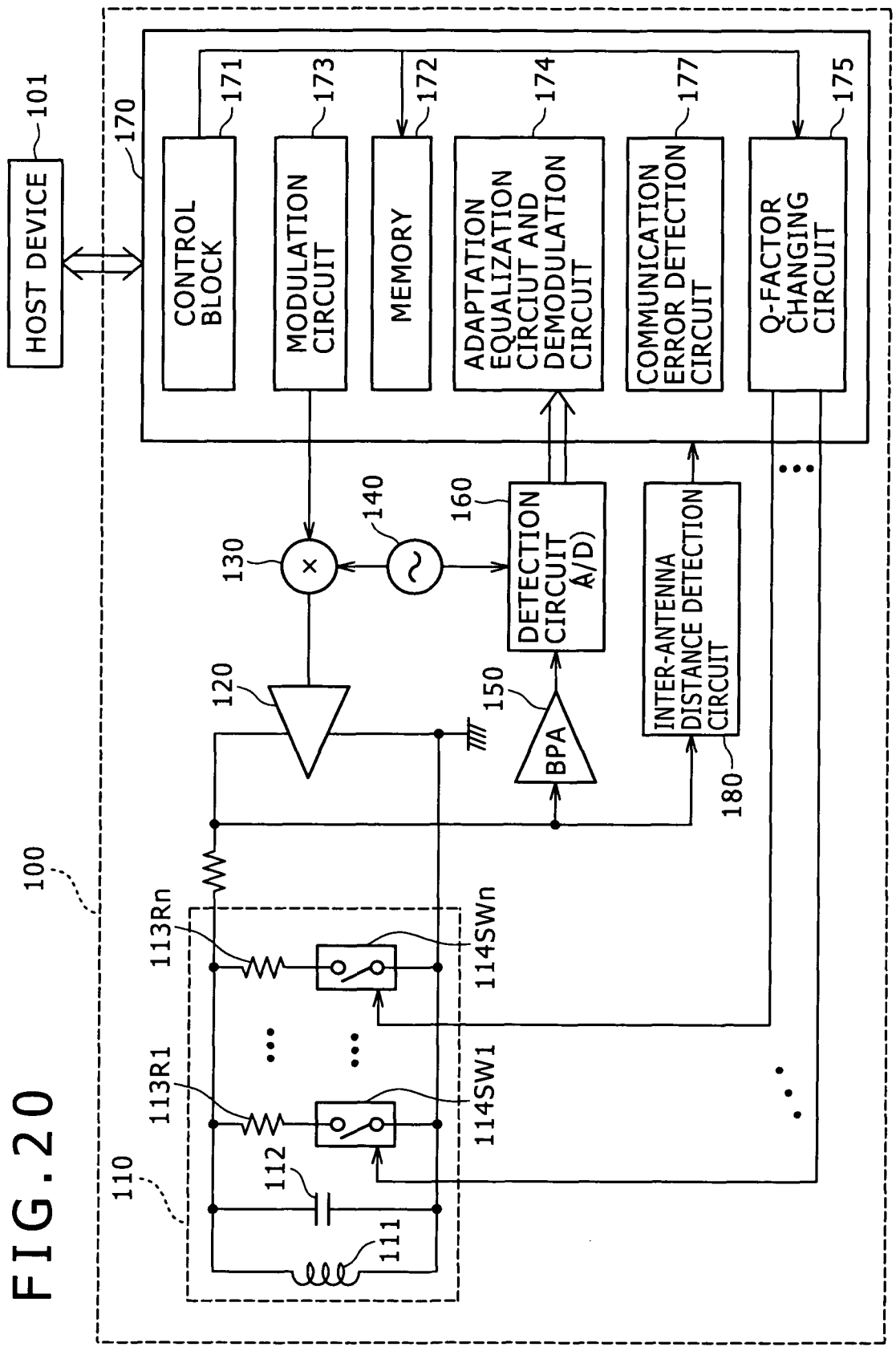
FIG. 20 is a block diagram showing a typical structure of the reader/writer acting as the noncontact communication apparatus as part of a fifth embodiment of the present invention.
Figure 21:
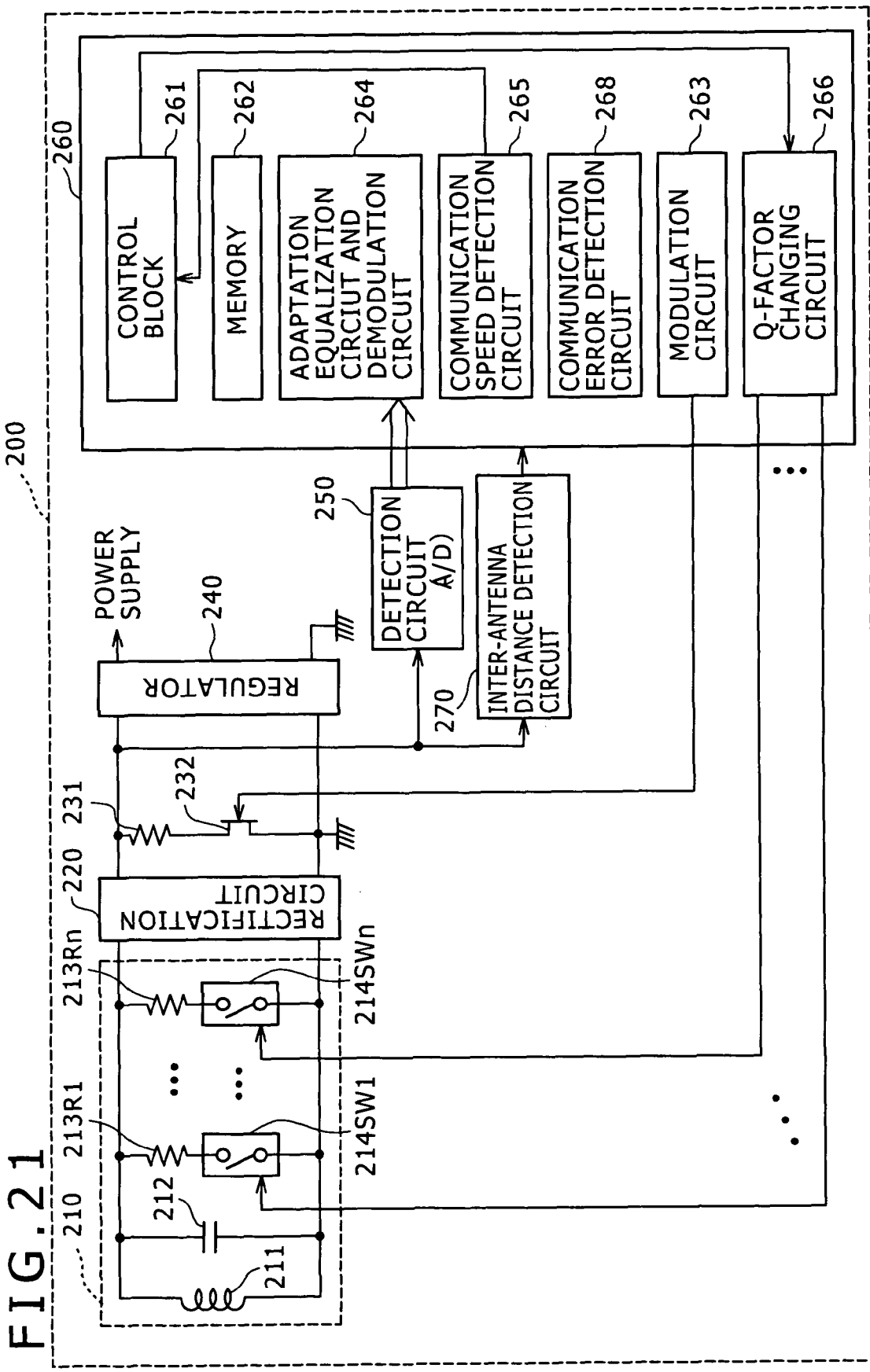
FIG. 21 is a block diagram showing a typical structure of the transponder acting as the noncontact communication apparatus as part of the fifth embodiment of the present invention.

In the fifth embodiment, the Q-factor of the antenna resonance circuit is varied depending not only on the communication speed and inter-antenna distance but also on communication error status. FIG. 20 is a block diagram showing a typical structure of the reader/writer 100 as part of the fifth embodiment. FIG. 21 is a block diagram showing a typical structure of the transponder 200 as another part of the fifth embodiment. The fifth embodiment of this example is a variation of the third embodiment.

In the reader/writer 100 of the fifth embodiment, as shown in FIG. 20, the signal processing section 170 includes a communication error detection circuit 177 which is an addition to the typical structure shown in FIG. 13. In the transponder 200 of the fifth embodiment, as indicated in FIG. 21, the signal processing section 260 includes a communication error detection circuit 268 which is an addition to the typical structure depicted in FIG. 14.

The communication error detection circuits 177 and 268 are each furnished with an error detection counter. Every time a communication error is detected upon packet reception, the count value on the error detection counter (i.e., error count) is incremented by one.

If communication errors are detected consecutively, the communication error detection circuits 177 and 268 each increment the error count on the error detection counter continuously. When the packet is normally received, the communication error detection circuits 177 and 268 each clear the error count on the error detection counter to zero.

The result of the communication error detection (error count) performed by each of the communication error detection circuits 177 and 268 is sent to the control blocks 171 and 261 respectively.

The memories 172 and 262 of the fifth embodiment each contain the same Q-factor changing table information as that shown in FIG. 15 in connection with the third embodiment. As with the above-described third embodiment, the control blocks 171 and 261 of the fifth embodiment set the Q-factor in accordance with the communication speed and inter-antenna distance in effect. If the result of the communication error detection (error count) coming from one of the communication error detection circuits 177 and 268 is found to have exceeded a threshold value, the control blocks 171 and 261 reduce the currently established Q-factor.

Even if there is no change in the communication speed or inter-antenna distance, when the result of the communication error detection from the communication error detection circuit 177 or 268 is found to have exceeded the threshold value, the control block 171 or 268 exercises control in a manner reducing the Q-factor being set.

In that case, the control blocks 171 and 261 may reduce the Q-factor in diverse ways. The Q-factor may illustratively be reduced not only one level at a time but also in units of a plurality of levels. The error count used as the threshold value may typically range from one to five and may preferably be three.

If communication errors persist even after the Q-factor is reduced, the Q-factor is further lowered. If communication errors occur in excess of the threshold value after the Q-factor is reduced to its minimum setting, then the control blocks 171 and 261 recognize an incommunicable state.

Illustratively, suppose that communication is started at the communication speed of 3.4 Mbps over the inter-antenna distance ranging from 30 mm to 50 mm. The Q-factor in this case is set to 32 as shown in FIG. 22.

In the above state, if the error count detected by the communication error detection circuits 177 and 268 has exceeded the threshold value, then the control blocks 171 and 261 reduce the Q-factor by one level to 24 as shown in the example of FIG. 22. If the error count detected by the communication error detection circuits 177 and 268 is still found to have exceeded the threshold value with the Q-factor thus changed, the control blocks 171 and 261 reduce the Q-factor by one more level to 16. The Q-factor may be reduced by two or more levels at a time.

According to the fifth embodiment, the Q-factor can be controlled as discussed above. The reader/writer 100 and transponder 200 can automatically adjust the Q-factor until the waveform distortion is reduced to a degree that can be dealt with by the adaptive equalization circuit.

<Flow of Processing Operations Performed by the Reader/writer 100>

Figure 23:
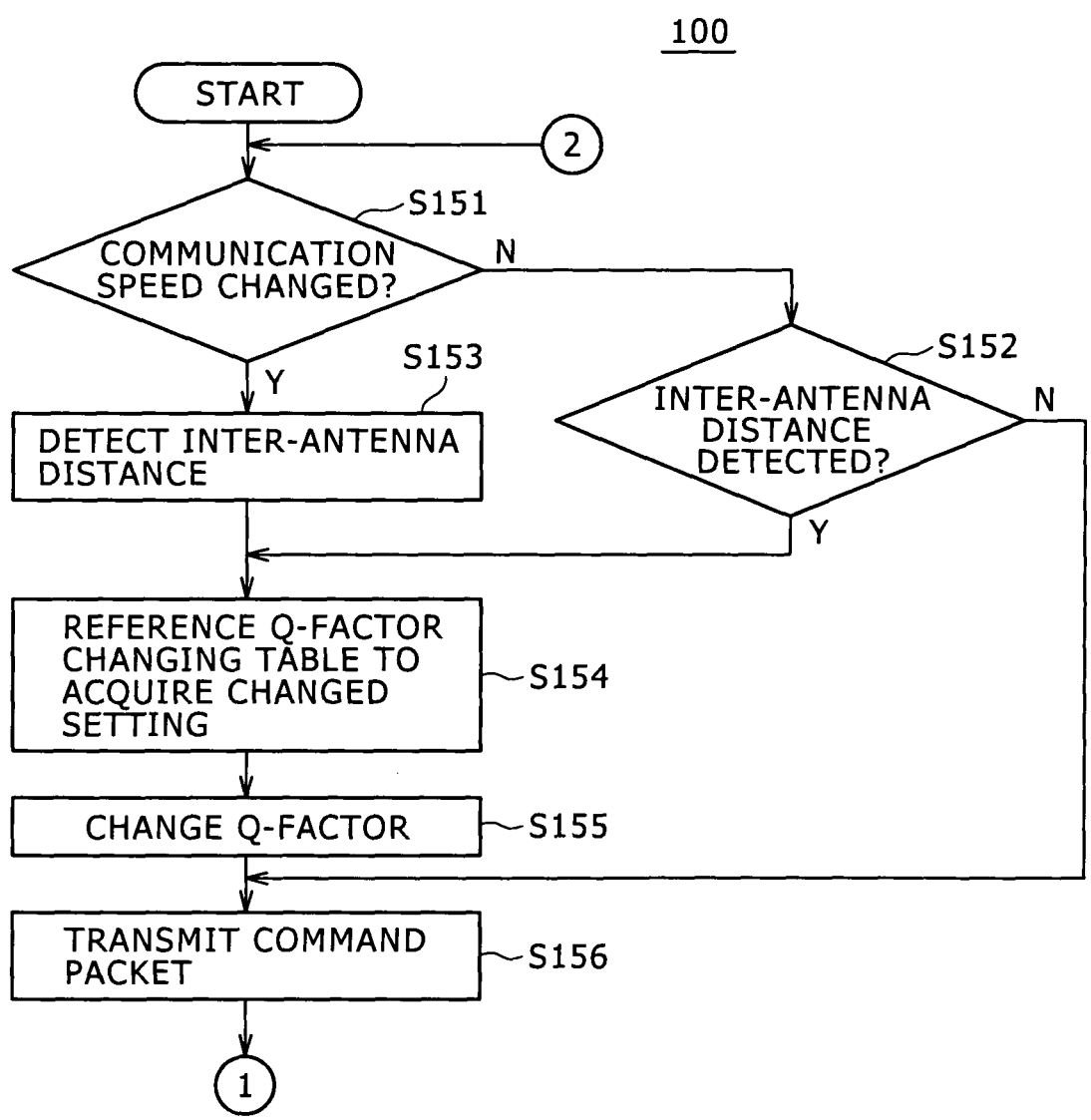
FIG. 23 is a partial flowchart explanatory of the processing steps performed by the reader/writer acting as the noncontact communication apparatus as part of the fifth embodiment of the present invention.
Figure 24:
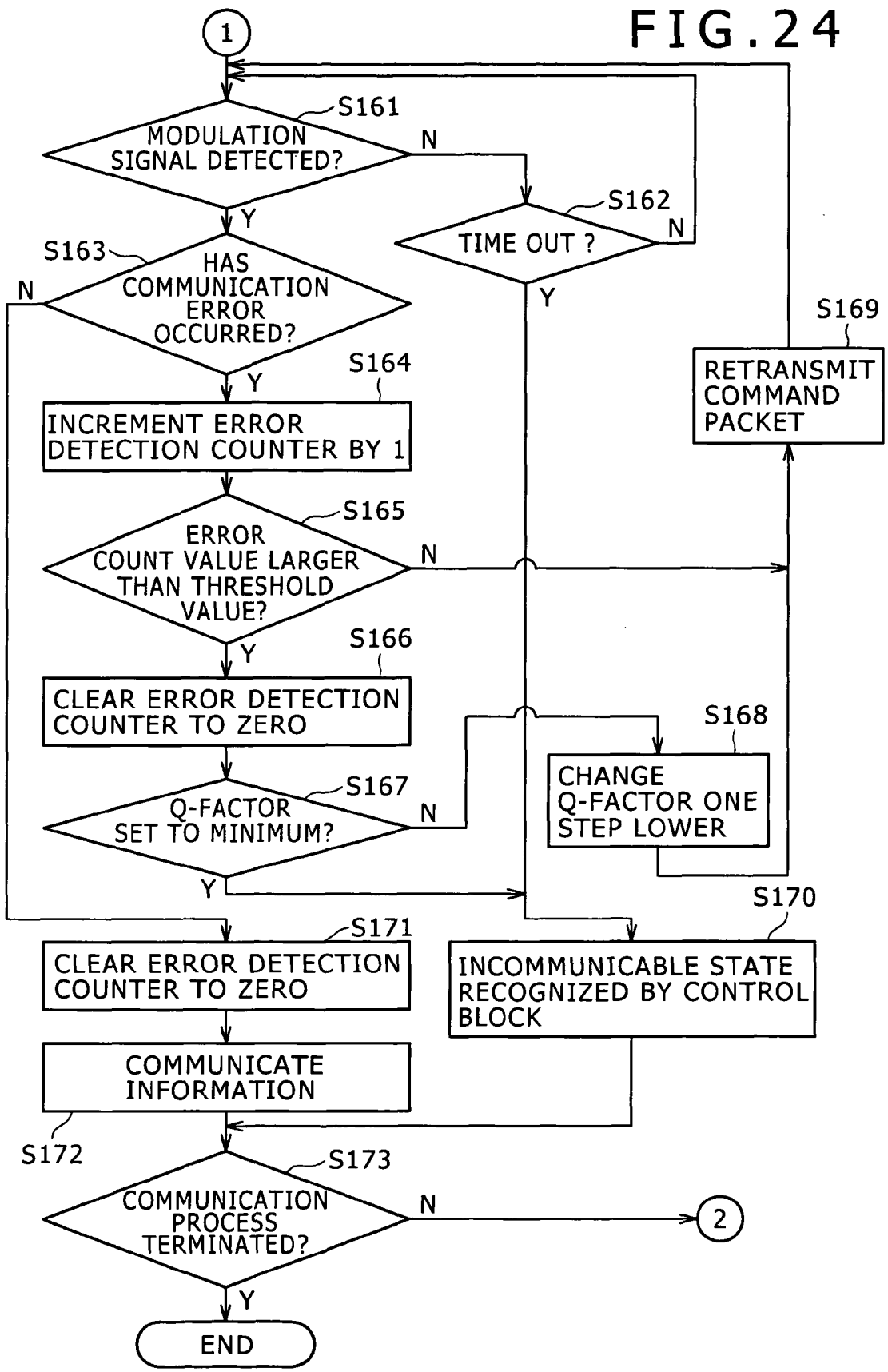
FIG. 24 is a partial flowchart explanatory of the processing steps performed by the reader/writer acting as the noncontact communication apparatus as part of the fifth embodiment of the present invention.

Explained below in reference to the flowcharts of FIGS. 23 and 24 is the flow of processing operations performed by the reader/writer 100 of the fifth embodiment. The processing in FIGS. 23 and 24 is executed under control of the control block 171. For purpose of explanation of FIGS. 23 and 24, it is assumed that the control block 171 possesses the function of the Q-factor changing circuit 175 as well.

In step S151, the control block 171 checks to determine whether the communication speed has changed. If in step S151 the communication speed is not found to be changed, the control block 171 goes to step S152. In step S152, the control block 171 checks to determine whether the inter-antenna distance has changed so much as to exceed the applicable threshold distances in the above-described Q-factor changing table, based on the detection output of the inter-antenna distance detection circuit 180.

If in step S152 the inter-antenna distance is not found to have changed in a manner exceeding the applicable threshold distances in the Q-factor changing table, the control block 171 goes to step S156. In step S156, the control block 171 transmits a polling command packet while keeping the current communication speed and Q-factor unchanged.

If in step S151 the communication speed is found to be changed, the control block 171 goes to step S153. In step S153, the control block 171 recognizes the inter-antenna distance based on the detection output of the inter-antenna distance detection circuit 180. In step S154, the control block 171 references the Q-factor changing table information in the memory 172 to recognize (acquire) the Q-factor corresponding to the changed communication speed as well as to the recognized inter-antenna distance.

If in step S152 the inter-antenna distance is found to have changed in a manner exceeding the applicable threshold distances, the control block 171 also goes to step S154. In step S154, the control block 171 also references the Q-factor changing table information in the memory 172 to recognize (acquire) the Q-factor corresponding to the changed communication speed as well as to the recognized inter-antenna distance.

Step S154 is followed by step S155 in which the control block 171 turns on or off the switch circuits 114SW1 through 114SWn of the antenna resonance circuit 110 in such a manner as to switch to the recognized Q-factor. In step S156, the control block 171 transmits a polling command packet at the changed communication speed.

After transmitting the polling command packet in step S156, the control block 171 goes to step S161 in FIG. 24. In step S161, the control block 171 checks to determine whether a modulation signal is received from the transponder 200.

If in step S161 the modulation signal is not found to be received, the control block 171 goes to step S162. In step S162, the control block 171 checks to determine whether the signal-unreceived state has exceeded a predetermined time period.

If in step S162 the state in which the modulation signal is not received has yet to exceed the predetermined time period, the control block 171 returns to step S161. In step S161, the control block 171 waits for the modulation signal to be received.

If in step S162 the state in which the modulation signal has yet to arrive has exceeded the predetermined time period, the control block 171 goes to step S170. In step S170, the control block 171 recognizes an incommunicable state.

In step S173, the control block 171 checks to determine whether the communication process has come to an end. If in step S173 the communication process is not found to be terminated, then the control block 171 returns to step S151 in FIG. 23. If in step S173 the communication process is found to have ended, the control block 171 terminates the above-described processing routine.

If in step S161 the modulation signal is found to be received, the control block 171 goes to step S163. In step S163, the control block 171 checks to determine whether a communication error has occurred from the output of the communication error detection circuit 177. The fact that the modulation signal is detected in step S161 signifies the reception of a response packet in response to the command packet that was transmitted earlier. The control block 171 then checks in step S163 to determine whether any communication error has occurred with regard to the response packet.

If in step S163 no communication error is found to have occurred, the control block 171 goes to step S171. In step S171, the control block 171 clears to zero the error count on the error detection counter of the communication error detection circuit 177. With the response packet normally received, the control block 171 goes to step S172 and communicates information with the transponder 200.

The control block 171 then goes to step S173 and checks to determine whether the communication process has come to an end. If the communication process is not found to be terminated, the control block 171 returns to step S151 in FIG. 23. If in step S173 the communication process is found to have ended, the control block 171 terminates the above-described processing routine.

If in step S163 a communication error is found to have occurred, the control block 171 goes to step S164. In step S164, the control block 171 increments by one the error count on the error detection counter of the communication error detection circuit 177.

In step S165, the control block 171 checks to determine whether the error count has reached or exceeded a threshold value. If the error count is not found to have reached or exceeded the threshold value, the control block 171 goes to step S169 and retransmits the command packet. Thereafter, the control block 171 returns to step S161 and repeats the subsequent steps.

If in step S165 the error count is found to have reached or exceeded the threshold value, the control block 171 goes to step S166. In step S166, the control block 171 clears to zero the error count on the error detection counter.

In step S167, the control block 171 checks to determine whether the Q-factor is set to the smallest of the five predetermined values. If the Q-factor is not found set to the smallest value, the control block 171 goes to step S168. In step S168, the control block 171 changes the Q-factor one step lower. If the Q-factor is found set to the largest value or a value close thereto, the Q-factor may be changed two or more steps lower.

The control block 171 then goes to step S169 and retransmits the command packet. Thereafter, the control block 171 returns to step S161 and repeats the subsequent steps.

If in step S167 the Q-factor is found set to the smallest value, the control block 171 goes to step S170. In step S170, the control block 171 recognizes an incommunicable state.

In step S173, the control block 171 checks to determine whether the communication process has come to an end. If the communication process is not found to be terminated, the control block 171 returns to step S151 in FIG. 23. If in step S173 the communication process is found to have ended, the control block 171 terminates the above-described processing routine.

<Flow of Processing Operations Performed by the Transponder 200>

Figure 25:
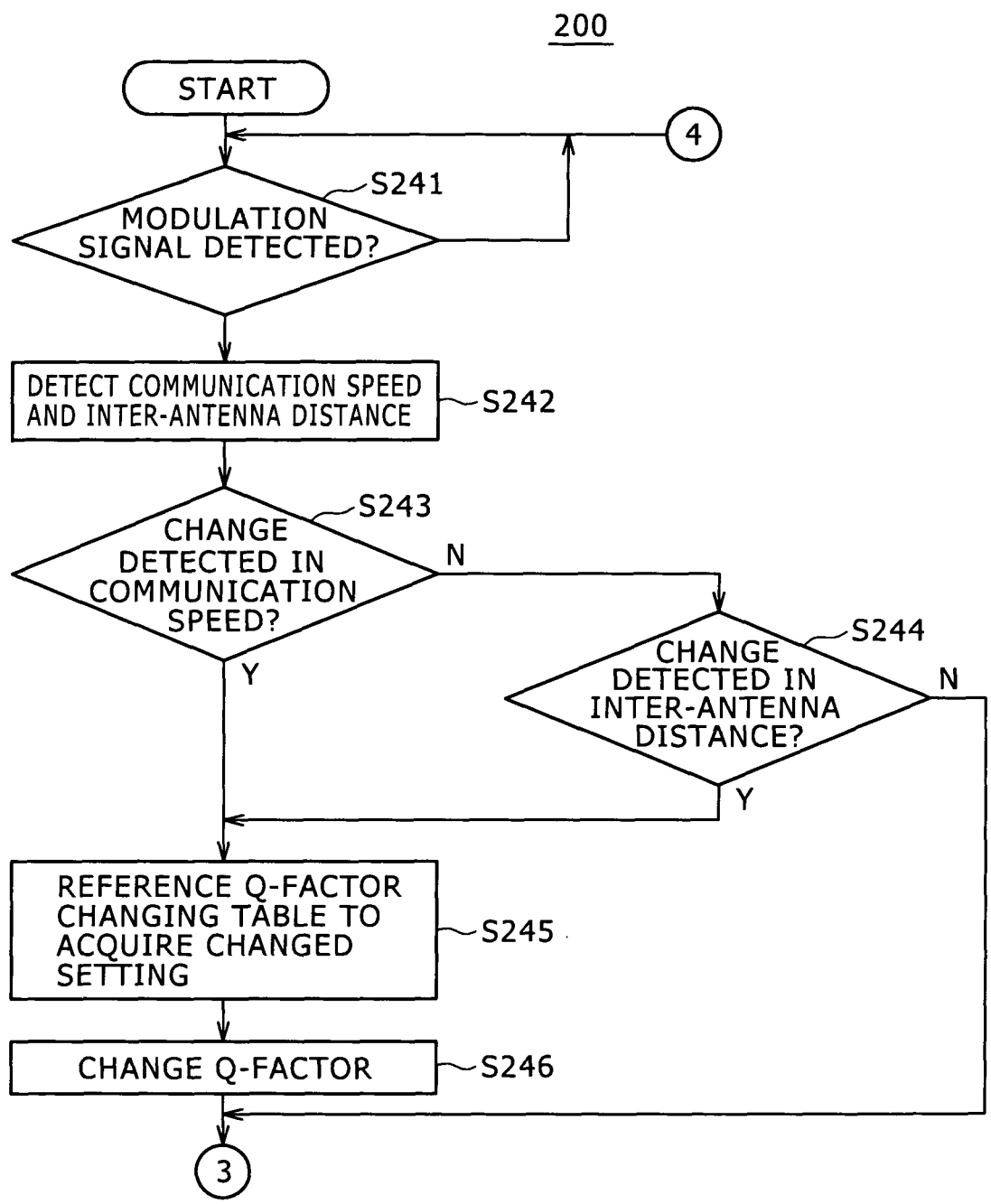
FIG. 25 is a partial flowchart explanatory of the processing steps performed by the transponder acting as the noncontact communication apparatus as part of the fifth embodiment of the present invention.
Figure 26:
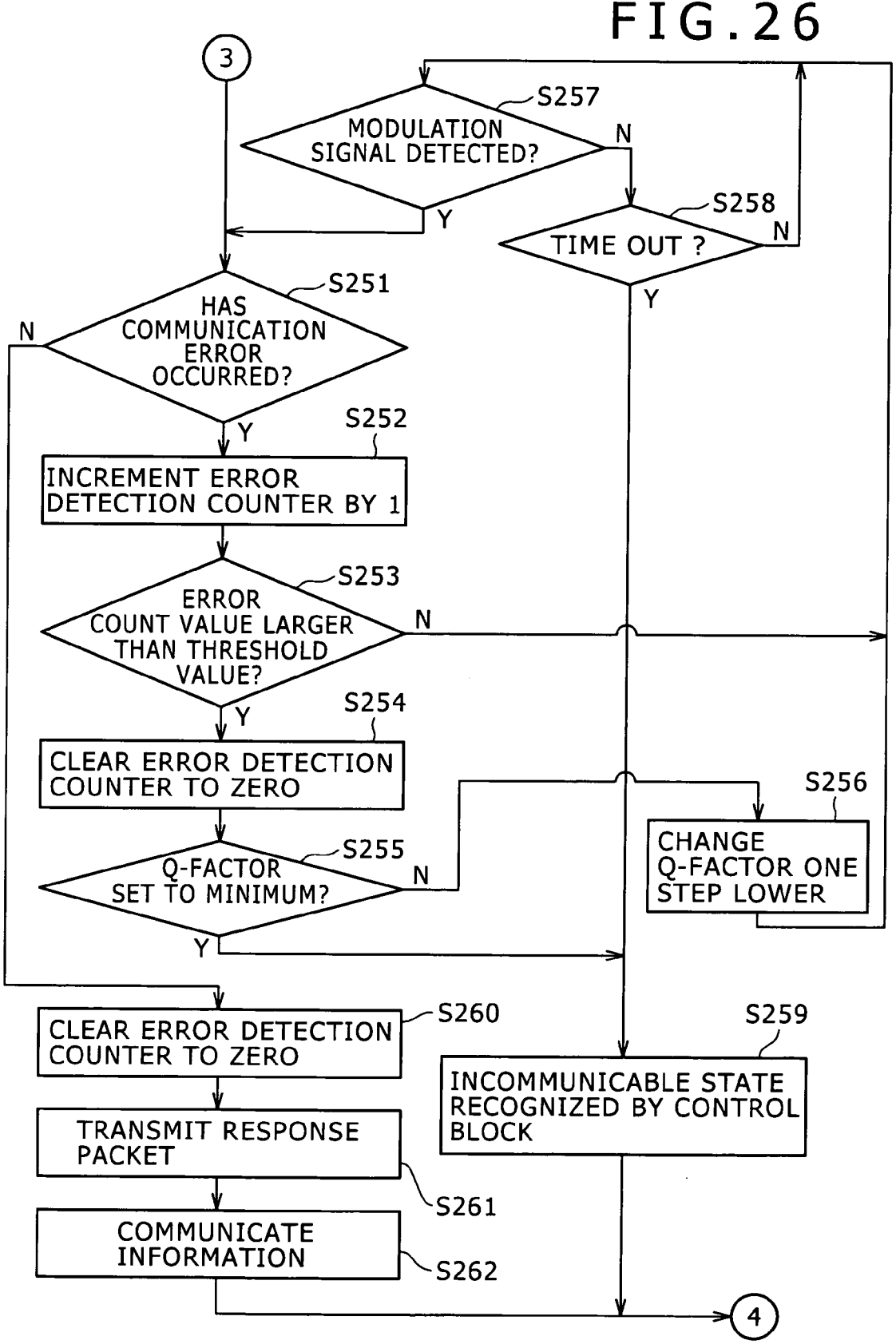
FIG. 26 is a partial flowchart explanatory of the processing steps performed by the transponder acting as the noncontact communication apparatus as part of the fifth embodiment of the present invention.

Explained below with reference to the flowcharts of FIGS. 25 and 26 in series is the flow of processing operations performed by the transponder 200 of the fifth embodiment. The processing in FIGS. 25 and 26 is executed under control of the control block 261. For purpose of explanation of FIGS. 25 and 26, it is assumed that the control block 261 possesses the function of the Q-factor changing circuit 266 as well.

In step S241, the control block 261 checks to determine whether a modulation signal is received from the reader/writer 100. If the modulation signal is found to be received, the control block 261 goes to step S242. In step S242, the control block 261 detects the communication speed sensed by the communication speed detection circuit 265 and also detects the inter-antenna distance sensed by the inter-antenna distance detection circuit 270.

In step S243, the control block 261 checks to determine whether the detected communication speed is different from the communication speed derived from the previously sensed demodulation signal. That is, the control block 261 determines whether the communication speed has changed.

If in step S243 the communication speed is found to have changed, the control block 261 goes to step S245. In step S245, the control block 261 references the Q-factor changing table information in the memory 262 to recognize (i.e., acquire) the Q-factor corresponding to the changed communication speed as well as to the inter-antenna distance detected in step S242.

If in step S243 the communication speed is not found to have changed, the control block 261 goes to step S244. In step S244, the control block 261 checks to determine whether the inter-antenna distance has changed so much as to exceed the applicable threshold distances in the above-described Q-factor changing table, based on the inter-antenna distance detected in step S242.

If in step S244 the inter-antenna distance is found to have changed in a manner exceeding the applicable threshold distances, the control block 261 goes to step S245. In step S245, the control block 261 references the Q-factor changing table information in the memory 262 to recognize (acquire) the Q-factor corresponding to the current communication speed as well as to the recognized inter-antenna distance.

Step S245 is followed by step S246 in which the control block 261 turns on or off the switch circuits 214SW1 through 214SWn of the antenna resonance circuit 210 in such a manner as to switch to the recognized Q-factor.

After step S246, the control block 261 goes to step S251 in FIG. 26. In step S251, the control block 261 checks to determine whether a communication error has occurred in the packet received after the modulation signal was detected in step S241, on the basis of the output of the communication error detection circuit 268.

If in step S251 no communication error is found to have occurred, the control block 261 goes to step S260. In step S260, the control block 261 clears to zero the error count on the error detection counter of the communication error detection circuit 268. With the command packet normally received, the control block 261 goes to step S261 and transmits a response packet to the reader/writer 100. The control block 261 then goes to step S262 and communicates information with the reader/writer 100, before returning to step S241 of FIG. 25.

If in step S251 a communication error is found to have occurred, the control block 261 goes to step S252. In step S252, the control block 261 increments by 1 the error count on the error detection counter of the communication error detection circuit 268.

In step S253, the control block 261 checks to determine whether the error count has reached or exceeded a threshold value. If the error count is not found to have reached or exceeded the threshold value, the control block 261 goes to step S257 and waits for the modulation signal to be transmitted from the reader/writer 100.

If in step S257 the modulation signal is found to be received, the control block 261 goes to step S251. The control block 261 then repeats step S251 and the subsequent steps.

If in step S257 the modulation signal is not found to be received, the control block 261 goes to step S258. In step S258, the control block 261 checks to determine whether the signal-unreceived state has exceeded a predetermined time period.

If in step S258 the state in which the modulation signal is not received has yet to exceed the predetermined time period, the control block 261 returns to step S257. In step S257, the control block 261 waits for the modulation signal to be received.

If in step S258 the state in which the modulation signal has yet to arrive has exceeded the predetermined time period, the control block 261 goes to step 259. In step S259, the control block 261 recognizes an incommunicable state. The control block 261 then returns to step S241 and repeats the subsequent steps.

If in step S253 the error count is found to have reached or exceeded the threshold value, the control block 261 goes to step S254. In step S254, the control block 261 clears to zero the error count on the error detection counter.

In step S255, the control block 261 checks to determine whether the Q-factor is set to the smallest of the five predetermined values. If the Q-factor is not found set to the smallest value, the control block 261 goes to step S256. In step S256, the control block 261 changes the Q-factor one step lower.

The control block 261 then goes to step S257. In step S257, the control block 261 checks to determine whether the modulation signal (command packet) is received from the reader/writer 100. The control block 261 then repeats the steps subsequent to step S257.

If in step S255 the Q-factor is found set to the smallest value, the control block 261 goes to step S259. In step S259, the control block 261 recognizes an incommunicable state. The control block 261 then returns to step S241 in FIG. 25 and repeats the subsequent steps.

According to the fifth embodiment, the Q-factor is reduced in keeping with the communication error count. The Q-factor can thus be adjusted automatically until the waveform distortion involved is alleviated to a degree that can be dealt with by the adaptive equalization circuit.

As with the third and the fourth embodiments, the above-described fifth embodiment is implemented by applying the present invention to the case in which the Q-factor is changed in accordance with communication speed and inter-antenna distance. Obviously, the way the Q-factor is reduced in keeping with the communication error count by the fifth embodiment can also be applied to the first or the second embodiment of this invention.

[Sixth Embodiment]

Under ISO14443-4 or NFCIP-1 Transport Protocol, as discussed above, it is possible to start communication at a low speed where communication can be conducted without reducing the Q-factor and to move on to high-speed communication later as needed. The sixth embodiment takes advantage of this feature of the above-cited protocol.

At low-speed communication with the sixth embodiment, it is possible for the two communicating devices to exchange information about each other's device specifications such as noncontact communication capabilities and communication characteristics. For example, what is exchanged by the two parties includes information about whether the transponder 200 is a non-powered noncontact card or a powered transponder incorporated in a mobile phone terminal. The sixth embodiment is arranged to have a plurality of sets of Q-factor changing table information in accordance with the device specifications involved.

That is, the reader/writer 100 and transponder 200 of the sixth embodiment each have a plurality of sets of Q-factor changing table information stored in an internal memory in accordance with the device specifications of the opposite party.

Figure 27B:
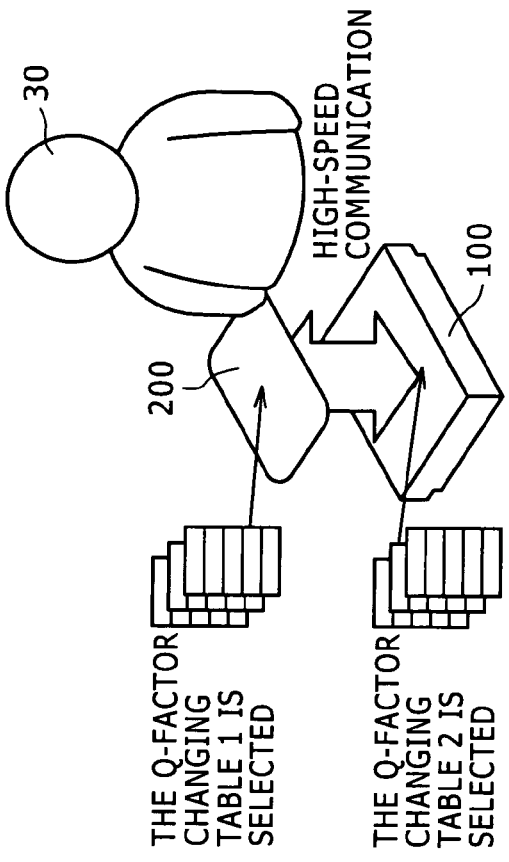
FIGS. 27A and 27B are schematic views showing a typical configuration of a noncontact communication system to which the noncontact communication method embodying the present invention is applied (as a sixth embodiment of the invention)
Figure 27A:
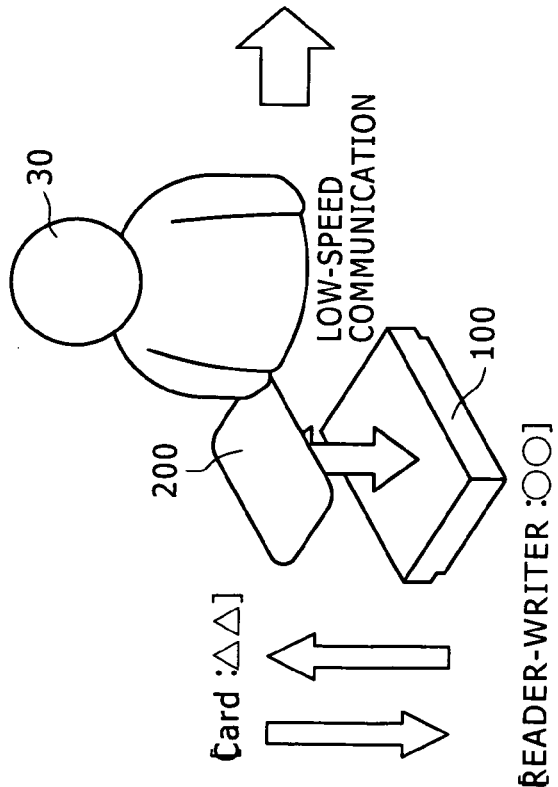

With the sixth embodiment, as shown in FIG. 27A, communication is started at a low speed between the reader/writer 100 and the transponder 200. The low-speed communication allows each of the communicating parties to identify the opposite device.

Transition is then effected to communication at a high speed. At this point, as shown in FIG. 27B, the reader/writer 100 and the transponder 200 each select one of the plurality of Q-factor changing tables which optimally fits the opposite device identified.

The Q-factor changing process is then carried out by the sixth embodiment using the selected Q-factor changing table. The process is performed under ISO14443-4 or NFCIP-1 Transport Protocol as with the above-described second through fifth embodiments of the invention.

According to the sixth embodiment, the control block 171 of the reader/writer 100 and the control block 261 of the transponder 200 each identify the opposite device before starting to communicate with one another at high speed. This feature is also useful for both parties to detect the inter-antenna distance therebetween.

[Other Embodiments and Variations]

In the preceding explanation of the embodiments, the reader/writer 100 and the transponder 200 were each shown to have the ability to change the Q-factor. Alternatively, one of the reader/writer 100 and transponder 200 alone may be arranged to have the capability of changing the Q-factor.

In particular, if the transponder 200 is a non-powered noncontact IC card, the device may well be rid of the Q-factor changing capability due to constraints such as slashed production costs or limited CPU performance speeds. In such a case, only the reader/writer 100 may be equipped with the ability to change the Q-factor.

The antenna resonance circuits 110 and 210 of the above-described embodiments each include the Q-factor changing circuit that has a plurality of resistors switched on and off to vary the Q-factor. However, this structure is only an example and is not limitative of the present invention.

Figure 28A:
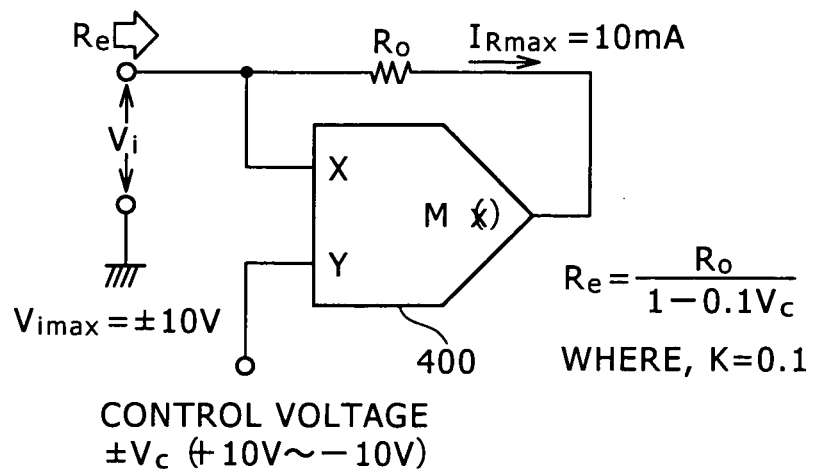
FIGS. 28A and 28B are schematic views showing a key point of a variation of the noncontact communication apparatus embodying the present invention.

For example, a voltage-controlled variable resistance multiplier such as one shown in FIG. 28A may be adopted to change the resistance value continuously using a control voltage Vc. This structure allows the Q-factor to be changed steplessly.

Figure 28B:
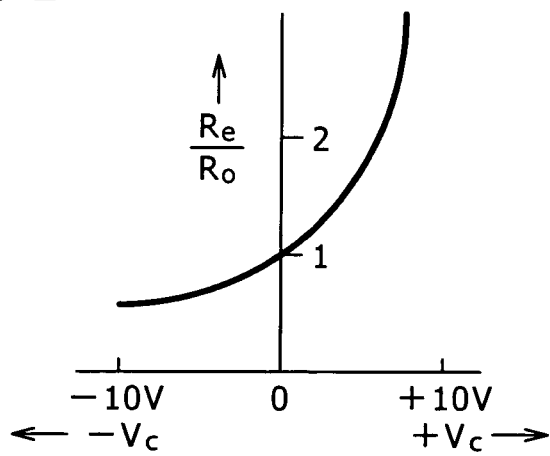

The above-mentioned voltage-controlled variable resistance multiplier is a circuit that uses an amplifier 400 to change an apparent resistance value Re as viewed from the input side through the use of the control voltage Vc. FIG. 28B graphically shows a resistance value characteristic of the voltage-controlled variable resistance multiplier in FIG. 28A relative to the control voltage Vc.

In the above-described embodiments, the transponder 200 was shown implemented as the noncontact IC card. Alternatively, the transponder 200 may come in diverse forms incorporated in various devices such as the mobile phone terminal. In the latter case, the picture information held in the mobile phone terminal may be transmitted by the built-in transponder to the reader/writer 100 at a high speed. In this variation, the present invention may be practiced advantageously in a manner permitting high-speed communication of picture information.

Figure 29:
FIG. 29 is a schematic view showing a typical partial configuration of a noncontact communication system to which the noncontact communication method embodying the present invention is applied as another variation of the invention.
Figure 30:
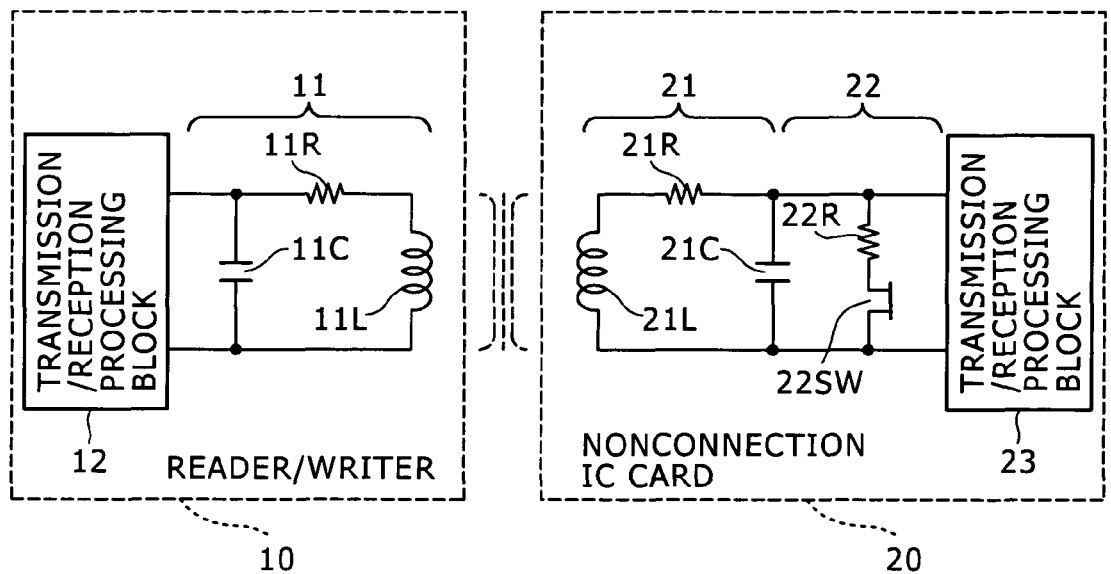
FIG. 30 is a schematic view explanatory of a typical structure of an ordinary noncontact communication system.
Figure 31:
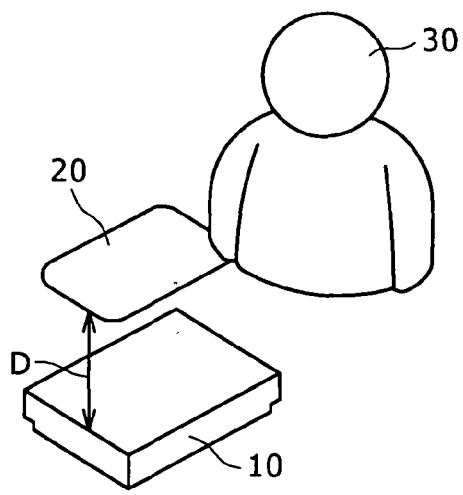
FIG. 31 is a schematic view explanatory of a typical configuration of the ordinary noncontact communication system.
Figure 32:
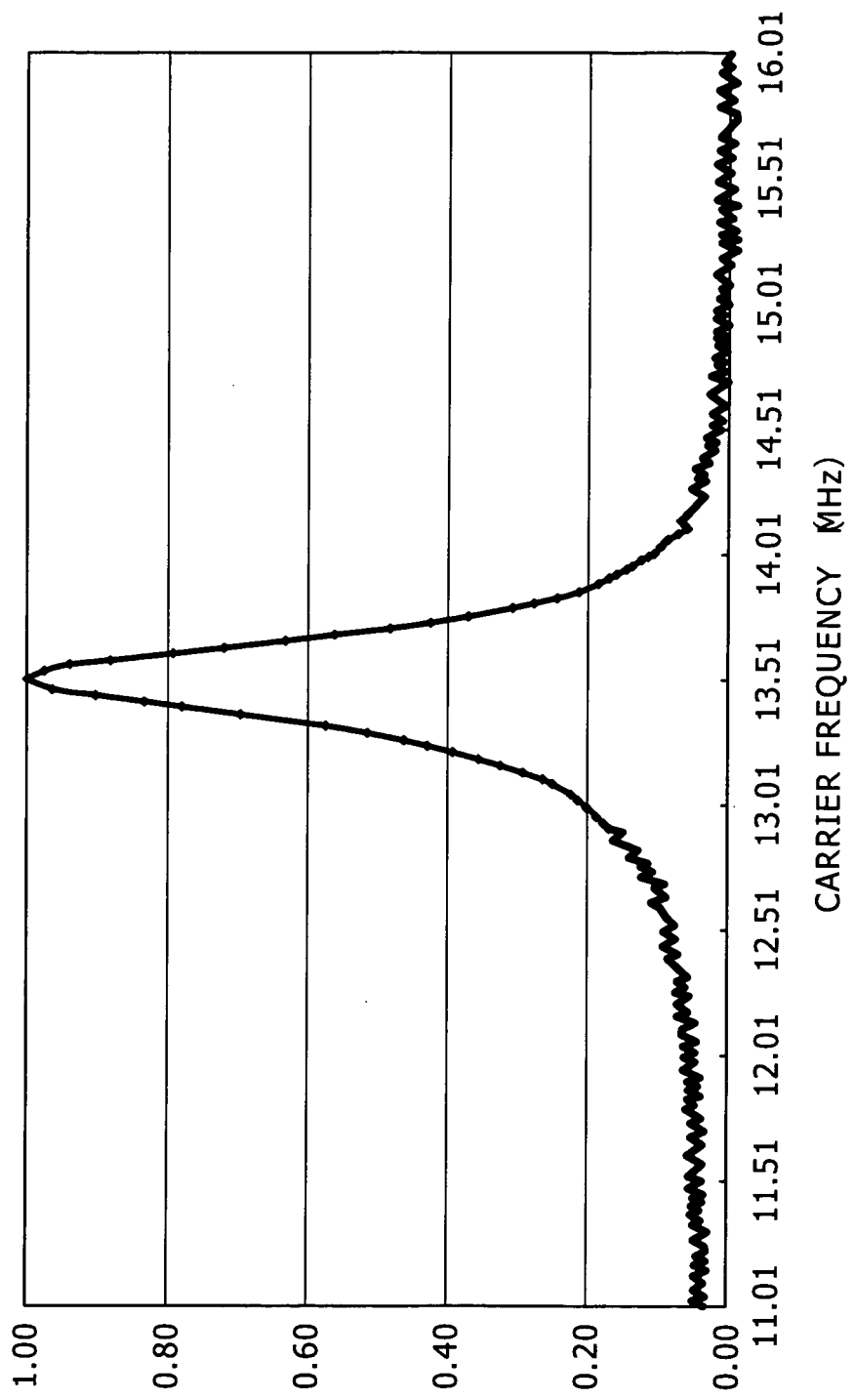
FIG. 32 is a graphic representation showing the resonance frequency characteristic of an antenna resonance circuit in a noncontact communication apparatus used by the ordinary noncontact communication system.

As another variation, mobile phone terminals 500A and 500B may each be equipped with the functions of both the reader/writer 100 and the transponder 200 as shown in FIG. 29. In this case, picture information stored in one mobile phone terminal may be transferred at a high speed to the other mobile phone terminal.

The present application contains subject matter related to that disclosed in Japanese Priority Patent Application JP 2009-153219 filed in the Japan Patent Office on Jun. 29, 2009, the entire content of which is hereby incorporated by reference.

It is to be understood that while the invention has been described in conjunction with specific embodiments with reference to the accompanying drawings, it is evident that many alternatives, modifications and variations will become apparent to those skilled in the art in light of the foregoing description. It is thus intended that the present invention embrace all such alternatives, modifications and variations as fall within the spirit and scope of the appended claims.

What is claimed is:

1. A noncontact communication apparatus comprising:
    an antenna resonance circuit configured to have a coil for communicating with an opposite party through electromagnetic coupling;
    changing means for changing a Q-factor of said antenna resonance circuit;
    control means for controlling said antenna resonance circuit to transmit and receive data to and from said opposite party at one of a plurality of communication speeds prepared beforehand, said control means further controlling said changing means to reduce said Q-factor the higher the communication speed in use;
    distance detection means for detecting a distance of communication with said opposite party by monitoring resonance characteristics of the antenna resonance circuit,
    wherein said control means controls said changing means to reduce said Q-factor the shorter the distance detected by said distance detection means; and
    a storage block configured to store correspondence table information indicating how distances of communication with said opposite party, said plurality of communication speeds, and Q-factors relative to combinations of said distances of communication with said communication speeds are interrelated, wherein
    said control means controls said changing means to change said Q-factor by referencing said correspondence table information stored in said storage block.

2. The noncontact communication apparatus according to claim 1, further comprising:
    a detection block configured to receive via said antenna resonance circuit an incoming signal formed by a carrier signal multiplexed with information, said detection block further analyzing envelope changes in said incoming signal so as to generate a detection signal including said information; and
    an equalization processing block configured to correct said detection signal so as to output a corrected detection signal, wherein
    said equalization processing block is constituted by adaptive equalization means made up of a digital filter.

3. The noncontact communication apparatus according to claim 1, wherein
    said control means has a capability to change in successively selective fashion said communication speed from among said plurality of communication speeds, said control means further determining fixedly the communication speed at which a response has been returned from said opposite party so as to perform the data communication with said opposite party.

4. The noncontact communication apparatus according to claim 1, wherein
    said control means has a capability to notify said opposite party of one of said plurality of communication speeds, said control means further performing the data communication with said opposite party at the communication speed at which a response to the notification has been returned from said opposite party.

5. The noncontact communication apparatus according to claim 4, wherein,
    when notifying said opposite party of one of said plurality of communication speeds, said control means selects a lower communication speed while controlling said changing means to raise said Q-factor.

6. The noncontact communication apparatus according to claim 1, further comprising
    communication speed detection means for detecting the communication speed at which data has been communicated from said opposite party, wherein
    said control means controls said changing means to set the Q-factor corresponding to said communication speed detected by said communication speed detection means.

7. The noncontact communication apparatus according to claim 1, further comprising
    communication error detection means for detecting a communication error, wherein,
    if the number of the communication errors detected by said communication error detection means exceeds a threshold value, said control means controls said changing means to reduce said Q-factor selectively.

8. The noncontact communication apparatus according to claim 1, further comprising
    a storage block configured to store correspondence table information representing the correspondence between said plurality of communication speeds on the one hand and the Q-factor for use at each of said communication speeds on the other hand, wherein
    said control means controls said changing means to change said Q-factor by referencing said correspondence table information stored in said storage block.

9. A noncontact communication method for use with a noncontact communication apparatus including an antenna resonance circuit configured to have a coil for communicating with an opposite party through electromagnetic coupling, and changing means for changing a Q-factor of said antenna resonance circuit, said noncontact communication method comprising:
    controlling said antenna resonance circuit to transmit and receive data to and from said opposite party at one of a plurality of communication speeds prepared beforehand; and
    controlling said changing means to reduce said Q-factor the higher the communication speed in use;
    detecting a distance of communication with said opposite party by monitoring resonance characteristics of the antenna resonance circuit,
    wherein said control means controls said changing means to reduce said Q-factor the shorter the distance detected by said distance detection means; and
    storing correspondence table information indicating how said distances of communication with said opposite party, said plurality of communication speeds, and Q-factors relative to combinations of said distances of communication with said communication speeds are interrelated,
    wherein the noncontact communication apparatus includes a storage block configured to perform said storing, and wherein said controlling said changing means includes changing said Q-factor by referencing said correspondence table information stored in said storage block.

10. A noncontact communication apparatus, comprising:

an antenna resonance circuit configured to have a coil for communicating with an opposite party through electromagnetic coupling;

a Q-factor changing circuit that changes a Q-factor of said antenna resonance circuit;

detection circuit that detects a distance of communication with said opposite party by monitoring resonance characteristics of the antenna resonance circuit, a controller that controls said antenna resonance circuit to transmit and receive data to and from said opposite party at one of a plurality of communication speeds prepared beforehand and that controls said Q-factor changing circuit to reduce said Q-factor the higher the communication speed and the shorter the distance of communication in use; and a memory that stores correspondence table information indicating how distances of communication with said opposite party, said plurality of communication speeds, and Q-factors relative to combinations of said distances of communication with said communication speeds are interrelated, wherein said controller controls said Q-factor changing circuit to chance said Q-factor by referencing said correspondence table information stored in said storage block.

11. The noncontact communication apparatus according to claim 4, wherein resonance characteristics include a resonance voltage of the antenna resonance circuit.

12. The noncontact communication apparatus according to claim 4, wherein resonance characteristics include a discriminated resonance frequency of the antenna resonance circuit.

13. The method of claim 9, wherein resonance characteristics include a resonance voltage of the antenna resonance circuit.

14. The method of claim 9, wherein resonance characteristics include a discriminated resonance frequency of the antenna resonance circuit.

15. The noncontact communication apparatus according to claim 10, wherein resonance characteristics include a resonance voltage of the antenna resonance circuit.

16. The noncontact communication apparatus according to claim 10, wherein resonance characteristics include a discriminated resonance frequency of the antenna resonance circuit.

* * * * *